US012784515B2

(12) United States Patent
Sumikawa et al.

(10) Patent No.: US 12,784,515 B2
(45) Date of Patent: Nov. 3, 2026

(54) DRIVER ASSISTANCE APPARATUS, DRIVER ASSISTANCE PROCESSING METHOD, AND NON-TRANSITORY RECORDING MEDIUM

(71) Applicant: SUBARU CORPORATION, Tokyo (JP)

(72) Inventors: Ryuichi Sumikawa, Tokyo (JP); Takeshi Torii, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 50 days.

(21) Appl. No.: 18/975,007

(22) Filed: Dec. 10, 2024

(65) Prior Publication Data

US 2025/0104488 A1 Mar. 27, 2025

Related U.S. Application Data

(63) Continuation of application No. PCT/JP2023/015318, filed on Apr. 17, 2023.

(51) Int. Cl.
*G06F 3/16* (2006.01)
*G07C 5/02* (2006.01)

(52) U.S. Cl.
CPC ............... *G07C 5/02* (2013.01); *G06F 3/165* (2013.01)

(58) Field of Classification Search
CPC ........... G07C 5/02; G06F 3/165; G01C 21/26; G08G 1/16
See application file for complete search history.

(56) References Cited

U.S. PATENT DOCUMENTS 7,521,623 B2 * 4/2009 Bowen .................. G11B 27/34 84/612
8,140,344 B2 * 3/2012 Kameyama ............ B60Q 1/143 382/104

(Continued)

FOREIGN PATENT DOCUMENTS

JP H11-183181 A 7/1999
JP H11-208370 A 8/1999

(Continued)

OTHER PUBLICATIONS

International Search Report (with English translation) and Written Opinion dated Jun. 6, 2023, from corresponding International Application No. PCT/JP2023/015318, 9 pages.

*Primary Examiner* — Nay Tun
(74) *Attorney, Agent, or Firm* — Rimon P.C.

(57) ABSTRACT

A driver assistance apparatus to be applied to a vehicle is configured to present behavior stability of the vehicle through auditory stimulation to a driver who drives the vehicle. The driver assistance apparatus: acquires data on sensitivity of the driver to a change in a reproduction method; selects an audio source data item to be reproduced, from among audio source data items, depending on the sensitivity of the driver; determines the behavior stability, based on a change in a behavior of the vehicle; reproduces the audio source data item by a normal reproduction way when the behavior stability is higher than a predetermined criterion; and reproduces the audio source data item by another reproduction way different from the normal reproduction way when the behavior stability is lower than the predetermined criterion.

10 Claims, 10 Drawing Sheets

| | | NOTICEABILITY OF CHANGE IN REPRODUCTION METHOD (AUDIO SOURCE ITEMS) | | | |
|---|---|---|---|---|---|
| | | DIFFICULT TO NOTICE (MUSIC PIECE A) | SLIGHTLY DIFFICULT TO NOTICE (MUSIC PIECE B) | SLIGHTLY EASY TO NOTICE (MUSIC PIECE C) | EASY TO NOTICE (MUSIC PIECE D) |
| SENSITIVITY TO CHANGE IN REPRODUCTION METHOD (DRIVERS) | LOW | UNSELECTABLE | UNSELECTABLE | UNSELECTABLE | SELECTABLE |
| | SLIGHTLY LOW | UNSELECTABLE | UNSELECTABLE | SELECTABLE | SELECTABLE |
| | SLIGHTLY HIGH | UNSELECTABLE | SELECTABLE | SELECTABLE | SELECTABLE |
| | HIGH | SELECTABLE | SELECTABLE | SELECTABLE | SELECTABLE |

(56) References Cited

U.S. PATENT DOCUMENTS

| | | | | |
|---|---|---|---|---|
| 8,529,407 | B2 * | 9/2013 | Nurmela ............ | A63B 24/0062 482/8 |
| 2009/0025539 | A1 * | 1/2009 | Sagoo ...................... | G10H 1/40 84/609 |
| 2010/0312369 | A1 * | 12/2010 | Dollar, Jr. ............... | G06F 16/78 707/E17.101 |
| 2015/0047495 | A1 * | 2/2015 | Neitzke .................... | G10H 1/18 84/609 |
| 2015/0053066 | A1 * | 2/2015 | Hampiholi ............. | B60K 35/10 84/602 |

FOREIGN PATENT DOCUMENTS

| | | | |
|---|---|---|---|
| JP | 2008-203217 | A | 9/2008 |
| JP | 2009-115567 | A | 5/2009 |
| JP | 2012-198344 | A | 10/2012 |

* cited by examiner

| BAR NUMBER | START POSITION [SECONDS] | END POSITION [SECONDS] |
|---|---|---|
| 0 | 0 | 10 |
| 1 | 10 | 20 |
| 2 | 20 | 30 |
| 3 | 30 | 40 |
| 4 | 40 | 50 |
| 5 | 50 | 60 |
| 6 | 60 | 70 |
| 7 | 70 | 80 |
| 8 | 80 | 90 |
| 9 | 90 | 100 |
| 10 | 100 | 110 |
| 11 | 110 | 120 |
| 12 | 120 | 130 |
| 13 | 130 | 140 |

FIG. 3

| | | NOTICEABILITY OF CHANGE IN REPRODUCTION METHOD (AUDIO SOURCE ITEMS) | | | |
|---|---|---|---|---|---|
| | | DIFFICULT TO NOTICE (MUSIC PIECE A) | SLIGHTLY DIFFICULT TO NOTICE (MUSIC PIECE B) | SLIGHTLY EASY TO NOTICE (MUSIC PIECE C) | EASY TO NOTICE (MUSIC PIECE D) |
| SENSITIVITY TO CHANGE IN REPRODUCTION METHOD (DRIVERS) | LOW | UNSELECTABLE | UNSELECTABLE | UNSELECTABLE | SELECTABLE |
| | SLIGHTLY LOW | UNSELECTABLE | UNSELECTABLE | SELECTABLE | SELECTABLE |
| | SLIGHTLY HIGH | UNSELECTABLE | SELECTABLE | SELECTABLE | SELECTABLE |
| | HIGH | SELECTABLE | SELECTABLE | SELECTABLE | SELECTABLE |

FIG. 4

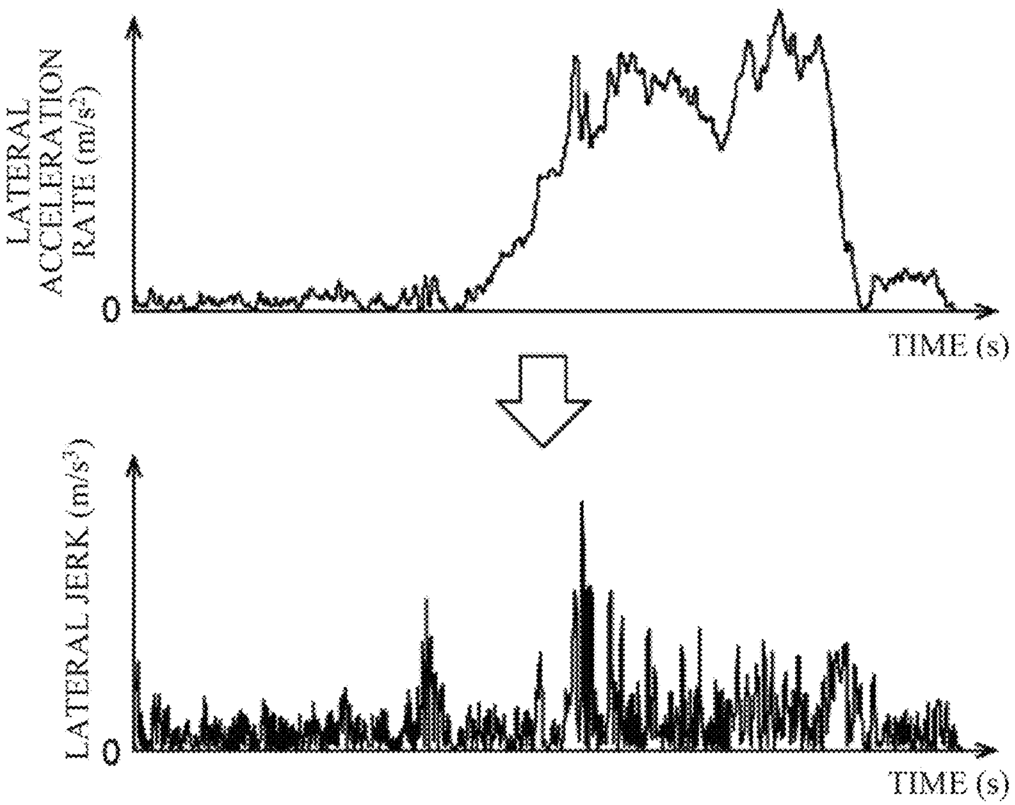

FIG. 5

| | | | | |
|---|---|---|---|---|
| INFORMATION ON ATTRIBUTES OF DRIVER | AGE OF DRIVER | OLD | THRESHOLD: HIGH (REFERENCE NUMBER OF TIMES: LARGE) | KINDS OF DATA: DECREASED |
| | NUMBER OF YEARS ELAPSING AFTER ACQUISITION OF DRIVER'S LICENSE | LARGE ↕ SMALL | THRESHOLD: LOW (REFERENCE NUMBER OF TIMES: SMALL) ↕ THRESHOLD: HIGH (REFERENCE NUMBER OF TIMES: LARGE) | KINDS OF DATA: INCREASED ↕ KINDS OF DATA: DECREASED |
| | FREQUENCY OF DRIVING | HIGH ↕ LOW | THRESHOLD: LOW (REFERENCE NUMBER OF TIMES: SMALL) ↕ THRESHOLD: HIGH (REFERENCE NUMBER OF TIMES: LARGE) | KINDS OF DATA: INCREASED ↕ KINDS OF DATA: DECREASED |
| | NUMBER OF YEARS OF GAP | LARGE | THRESHOLD: HIGH (REFERENCE NUMBER OF TIMES: LARGE) | KINDS OF DATA: DECREASED |

FIG. 6

DRIVER ASSISTANCE APPARATUS, DRIVER ASSISTANCE PROCESSING METHOD, AND NON-TRANSITORY RECORDING MEDIUM

CROSS-REFERENCE TO RELATED APPLICATIONS

This application is continuation of International Application No. PCT/JP2023/015318, filed on Apr. 17, 2023, the entire contents of which are hereby incorporated by reference.

BACKGROUND

The disclosure relates to a driver assistance apparatus, a driver assistance processing method, and a non-transitory recording medium that each improve skills in a driving operation of a vehicle.

Skills in a driving operation of a vehicle depend on a driver who drives the vehicle, and influence ride comfort and traffic safety. Meanwhile, various apparatuses have been proposed that each determine the driving operation performed by the driver, and notify a determination result of the driving operation to the driver or provide advice to the driver. For example, reference is made to Japanese Unexamined Patent Application Publication (JP-A) No. 2012-198344.

SUMMARY

An aspect of the disclosure provides a driver assistance apparatus to be applied to a vehicle. The driver assistance apparatus is configured to present behavior stability of the vehicle through auditory stimulation to a driver who drives the vehicle. The driver assistance apparatus includes one or more processors, one or more memories communicably coupled to the one or more processors, and an audio source data storage communicably coupled to the one or more processors. The audio source data storage is configured to hold audio source data items each including bars or parts and each being classified in accordance with noticeability of a change in a reproduction method of a corresponding one of the audio source data items. The noticeability is based on the change made to the reproduction method. The one or more processors are configured to: acquire data on sensitivity of the driver to the change in the reproduction method; select an audio source data item to be reproduced, from among the audio source data items, depending on the sensitivity of the driver; determine the behavior stability, based on a change in a behavior of the vehicle; reproduce the audio source data item by a normal reproduction way when the behavior stability is higher than a predetermined criterion, the normal reproduction way being designed to reproduce the audio source data item at a constant reproduction sound volume and at a constant reproduction speed while causing the bars or the parts to proceed in a predetermined order; and reproduce the audio source data item by another reproduction way different from the normal reproduction way when the behavior stability is lower than the predetermined criterion.

An aspect of the disclosure provides a driver assistance processing method that presents behavior stability of a vehicle through auditory stimulation to a driver who drives the vehicle. The method includes: acquiring data on sensitivity of the driver to a change in a reproduction method of each of audio source data items; selecting an audio source data item to be reproduced, from among the audio source data items, depending on the sensitivity of the driver, the audio source data items each including bars or parts and each being classified in accordance with noticeability of the change in the reproduction method of a corresponding one of the audio source data items, the noticeability being based on the change made to the reproduction method; determining the behavior stability, based on a change in a behavior of the vehicle; reproducing the audio source data item by a normal reproduction way when the behavior stability is higher than a predetermined criterion, the normal reproduction way being designed to reproduce the audio source data item at a constant reproduction sound volume and at a constant reproduction speed while causing the bars or the parts to proceed in a predetermined order; and reproducing the audio source data item by another reproduction way different from the normal reproduction way when the behavior stability is lower than the predetermined criterion.

An aspect of the disclosure provides a non-transitory computer-readable recording medium containing a program. The program causes, when executed by a computer, the computer to implement a method. The method includes: acquiring data on sensitivity of a driver who drives a vehicle to a change in a reproduction method of each of audio source data items; selecting an audio source data item to be reproduced, from among the audio source data items, depending on the sensitivity of the driver, the audio source data items each including bars or parts and each being classified in accordance with noticeability of the change in the reproduction method of a corresponding one of the audio source data items, the noticeability being based on the change made to the reproduction method; determining the behavior stability, based on a change in a behavior of the vehicle; reproducing the audio source data item by a normal reproduction way when the behavior stability is higher than a predetermined criterion, the normal reproduction way being designed to reproduce the audio source data item at a constant reproduction sound volume and at a constant reproduction speed while causing the bars or the parts to proceed in a predetermined order; and reproducing the audio source data item by another reproduction way different from the normal reproduction way when the behavior stability is lower the predetermined criterion.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 3 is an explanatory diagram illustrating an example of bar list data of an audio source data item.

FIG. 4 is an explanatory diagram illustrating an example of a data table in which selectable audio source data items are set depending on data on sensitivity to a change in a reproduction method.

FIG. 5 is an explanatory chart illustrating an example of a data conversion process to be performed by the driver assistance apparatus illustrated in FIG. 1.

FIG. 6 is an explanatory diagram illustrating an example of changing a threshold depending on attributes of a driver who drives the vehicle according to one example embodiment of the disclosure.

DETAILED DESCRIPTION

Figure 1:
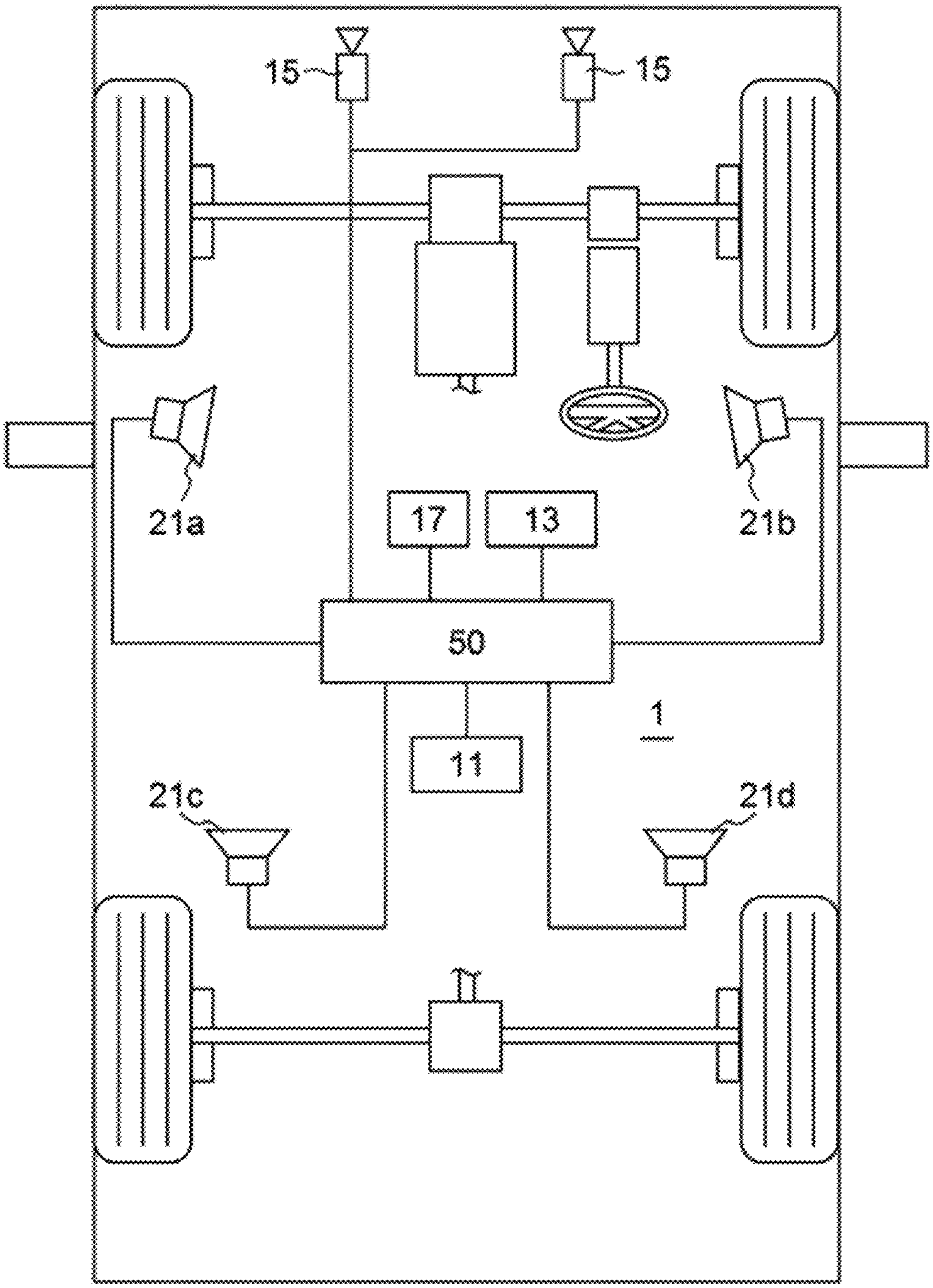
FIG. 1 is a schematic diagram illustrating a vehicle to which a driver assistance apparatus according to one example embodiment of the disclosure is applied.

Skills in a driving operation of a vehicle depend on a driver who drives the vehicle, and influence ride comfort and traffic safety. Meanwhile, various apparatuses have been proposed that each determine the driving operation performed by the driver, and notify a determination result of the driving operation to the driver or provide advice to the driver.

For example, JP-A No. 2012-198344 proposes a driver assistance apparatus that accurately determines a driving operation state, and enables a driver who drives a vehicle to learn information on a comprehensive evaluation of the driving operation state in current driving to thereby improve skills in a driving operation in the next driving. For example, JP-A No. 2012-198344 discloses the driver assistance apparatus including a change amount calculator, a jerk calculator, a state determiner, and a comprehensive determiner. The change amount calculator calculates a first related value that is related to a change amount of an acceleration rate. The jerk calculator calculates a second related value that is related to a jerk. The state determiner determines whether the driving operation state is in a smooth driving state or a shaky driving state, based on the first related value and the second related value in accordance with a determination criterion that is set in advance using a vibration model. The comprehensive determiner calculates a first evaluation index by calculating a score for a determination result by the state determiner of the current driving and dividing the score by the number of times of the determination by the state determiner in the current driving, and calculates a comprehensive evaluation score of the driving operation state in the current driving.

A driver assistance apparatus disclosed in JP-A No. 2012-198344 is designed to evaluate a series of driving operations performed during current driving. Accordingly, a driver who drives a vehicle has difficulty in understanding at which time point a particular one of the driving operations has been evaluated. One conceivable approach to address this involves presenting an evaluation result or advice on the driving operations to the driver who is driving by means of texts converted from sounds or of image display. In this approach, however, the driver can pay less attention to surroundings of the vehicle when checking contents of the evaluation result or the advice. Another conceivable approach involves notifying the driver of an occurrence of an unstable behavior of the vehicle during driving of the vehicle by the driver. In this approach, however, the driver can have an impression that his/her driving skills are denied. This can discourage the driver who is less motivated to improve the driving skills from improving the driving skills.

One conceivable approach to address these concerns involves notifying the driver of behavior stability of the vehicle by changing auditory stimulation such as sounds depending on the behavior stability of the vehicle. However, sensitivity to the change in the auditory stimulation varies for each driver depending on an attention state of the driver to the surroundings during the driving of the vehicle or on an audio source to be used. Accordingly, a failure of the driver to notice the change in the auditory stimulation can result in a decrease in an effect of stabilizing the behavior of the vehicle.

It is desirable to provide a driver assistance apparatus, a driver assistance processing method, and a non-transitory recording medium that each make it possible to present a change in behavior stability of a vehicle to a driver who drives the vehicle by changing auditory stimulation depending on the behavior stability of the vehicle, and thereby improve driving skills of the driver.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. Overview of Driver Assistance Apparatus

First, an overview of a driver assistance apparatus according to an example embodiment of the disclosure will be described. During traveling of a vehicle, the driver assistance apparatus acquires data indicating a behavior of the vehicle, determines behavior stability of the vehicle, based on the acquired data, and outputs a predetermined sound in accordance with a determination result. The behavior of the vehicle may mainly reflect driving operation states including a steering operation state, an accelerator operation state, and a brake operation state that are produced by a driver who drives the vehicle. This helps to allow the driver to intuitively recognize an evaluation of his/her driving operation state through auditory stimulation in real time.

The driver assistance apparatus according to the present example embodiment includes an audio source data storage. The audio source data storage holds multiple audio source data items each including multiple bars or multiple parts. The audio source data items are each classified in accordance with noticeability of a change in a reproduction method of a corresponding one of the audio source data items. The driver assistance apparatus selects an audio source data item to be reproduced, depending on sensitivity of the driver to the change in the reproduction method. When the behavior of the vehicle is stable, the driver assistance apparatus reproduces the audio source data item by a normal reproduction way at a constant reproduction sound volume and at a constant reproduction speed while causing the bars or the parts to proceed in a predetermined order. When the behavior of the vehicle is unstable, the driver assistance apparatus reproduces the audio source data item by another reproduction way different from the normal reproduction way.

Such a change in the reproduction method of the audio source data item depending on the behavior stability of the vehicle rarely gives the driver an impression that his/her driving skills are denied. Further, such a selection of the audio source data item whose change in the reproduction method is easily noticed by the driver allows the driver to intuitively recognize the behavior stability of the vehicle being driven by the driver, through the auditory stimulation in real time.

The term "noticeability of the change in the reproduction method of the audio source data item" used herein may refer to an index of or a criterion for musical characteristics as indicating whether the audio source data item is a music piece whose hearer easily notices a change made to one or more of a reproduction order, the reproduction sound volume, and the reproduction speed of the bars or the parts during reproduction of the audio source data item. Non-limiting examples of the audio source data item whose change in the reproduction method is easy to notice may include music pieces known to the driver of the vehicle. In this case, the multiple audio source data items may be each classified in accordance with the number of times of the reproduction, based on a reproduction history in past driving of the vehicle by the driver, and the classified multiple audio source data items may be held in the audio source data storage.

Note that the criterion for the noticeability of the change in the reproduction method of the audio source data item is not limited to the above-described example, and the multiple audio source data items may be each classified in accordance with any criterion. In some embodiments, based on data on the number of times of selecting each of the music pieces in karaoke by the driver of the vehicle in the past, the multiple audio source data items may be classified in such a manner that a music piece having been selected a larger number of times is a music piece whose change in the reproduction method is easier to notice. In some embodiments, the multiple audio source data items may be classified in such a manner that a music piece having a higher degree of coincidence with a music piece having been selected in the past in lyrics, an interval, and a rhythm is a music piece whose change in the reproduction method is easier to notice.

In the following description of the present example embodiment, the noticeability of the change in the reproduction method of the audio source data item may be indicated in four levels, i.e., "difficult to notice", "slightly difficult to notice", "slightly easy to notice", and "easy to notice". The audio source data storage may hold at least one music piece allocated to each of the levels. Note that a setting method of the index of the noticeability of the change in the reproduction method of the audio source data item is not particularly limited, and any setting method may be employed as long as the noticeability of the change in the reproduction method of the audio source data item is indicated in multiple levels.

The term "sensitivity of the driver to the change in the reproduction method of the audio source data item" used herein may refer to an index that indicates whether the driver is a person who easily notices the change made to one or more of the reproduction order, the reproduction sound volume, and the reproduction speed of the bars or the parts during the reproduction of the audio source data item. In the following description of the present example embodiment, the sensitivity of the driver to the change in the reproduction method of the audio source data item may be indicated in four levels, i.e., "low", "slightly low", "slightly high", and "high". However, a setting method of this index is not particularly limited, and any setting method may be employed as long as the sensitivity of the driver to the change in the reproduction method of the audio source data item is indicated in multiple levels.

Note that, in the following description of the present example embodiment, the "noticeability of the change in the reproduction method of the audio source data item" may be also referred to as "noticeability of the change in the reproduction method", and the "sensitivity of the driver to the change in the reproduction method of the audio source data item" may be also referred to as "sensitivity to the change in the reproduction method".

2. Configuration Example of Driver Assistance Apparatus

Figure 2:
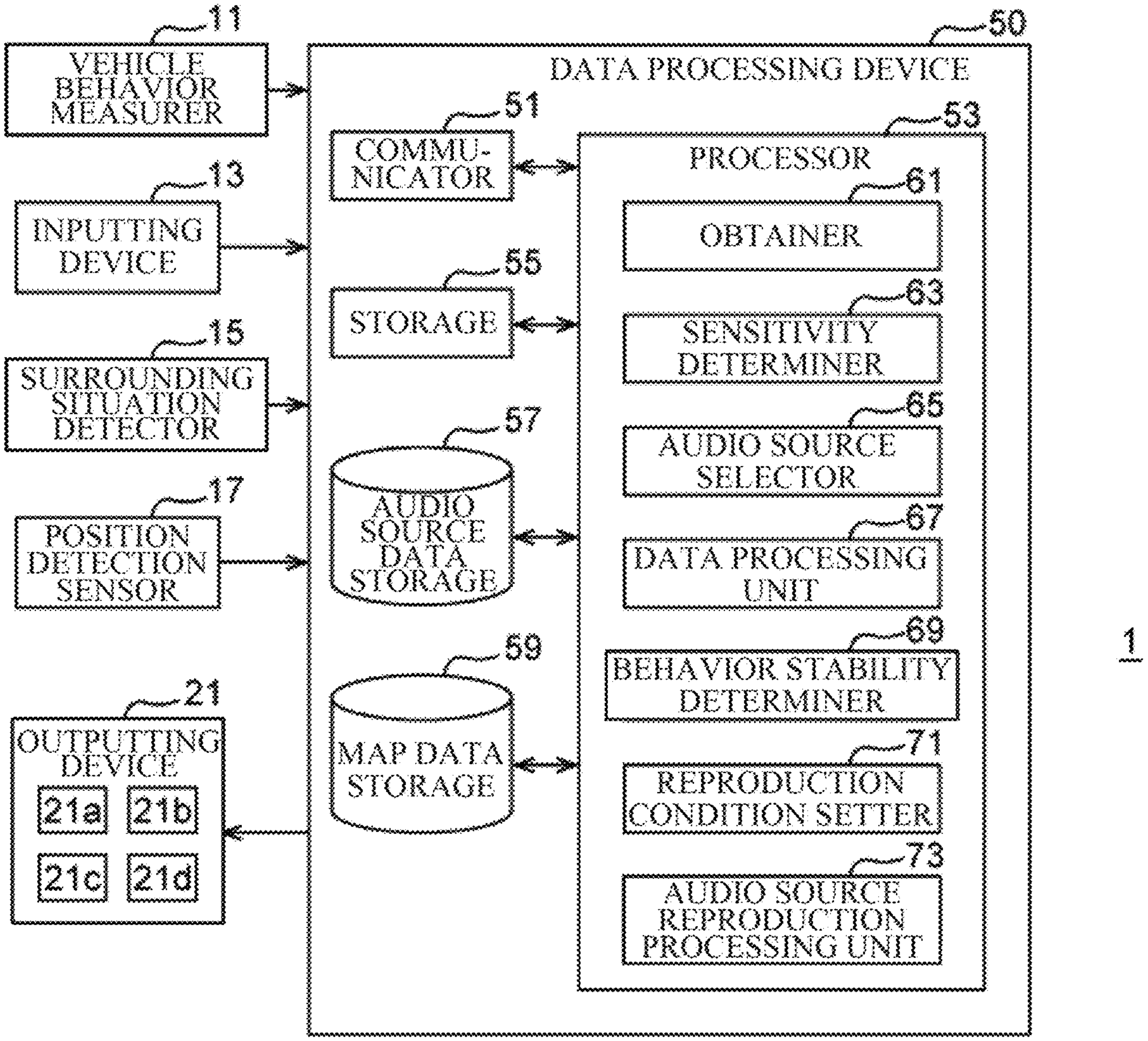
FIG. 2 is a block diagram illustrating a configuration example of the driver assistance apparatus illustrated in FIG. 1.

A configuration example of a driver assistance apparatus 1 according to the example embodiment of the disclosure will now be described with reference to FIGS. 1 and 2. FIG. 1 is a schematic diagram illustrating the vehicle to which the driver assistance apparatus 1 is applied. FIG. 2 is a block diagram illustrating the configuration example of the driver assistance apparatus 1.

The driver assistance apparatus 1 includes a data processing device 50. The data processing device 50 includes one or more processors such as a central processing unit (CPU), and one or more memories such as a random-access memory (RAM) or a read-only memory (ROM). The one or more memories are communicably coupled to the one or more processors. All or a part of the data processing apparatus 50 may include updatable software such as firmware, or may be, for example, a program module to be executed by a command from a processor.

The data processing device 50 may control an operation of the driver assistance apparatus 1 when the one or more processors execute a computer program. The computer program may cause the one or more processors to execute a later-described operation to be executed by the data processing device 50. The computer program to be executed by the one or more processors may be held in a recording medium that operates as a storage (a memory) 55 of the data processing device 50. In some embodiments, the computer program may be held in a recording medium incorporated in the data processing device 50. In some embodiments, the computer program may be held in any recording medium externally attachable to the data processing device 50. In one embodiment, the storage 55 may serve as a "non-transitory computer-readable recording medium".

Non-limiting examples of the recording medium that holds the computer program may include: a magnetic medium such as a hard disk, a floppy disk, or a magnetic tape; an optical recording medium such as a compact disk read-only memory (CD-ROM), a digital versatile disk (DVD), or Blu-ray (registered trademark); a magneto-optical medium such as a floptical disk; a storage device such as a RAM or a ROM; a flash memory such as a universal serial bus (USB) memory; and any other medium configured to hold programs.

The driver assistance apparatus 1 may also include a vehicle behavior measurer 11, an inputting device 13, a surrounding situation detector 15, a position detection sensor 17, and an outputting device 21. The vehicle behavior measurer 11, the inputting device 13, the surrounding situation detector 15, the position detection sensor 17, and the outputting device 21 may be each communicably coupled to the data processing device 50 via a communication bus such as a dedicated line or a controller area network (CAN).

(2-1. Vehicle Behavior Measurer)

The vehicle behavior measurer 11 may be a device that measures the data indicating the behavior of the vehicle. For example, the vehicle behavior measurer 11 may include one or more of a vehicle speed sensor, an acceleration rate sensor, and an angular velocity sensor. The vehicle speed sensor may detect, for example, a rotation speed of a drive shaft of the vehicle. The acceleration rate sensor may detect at least a longitudinal acceleration rate that is an acceleration rate in a longitudinal direction of a vehicle body, and a lateral acceleration rate that is an acceleration rate in a width direction of the vehicle body. The acceleration rate sensor may further detect a vertical acceleration rate that is an acceleration rate in a height direction of the vehicle body. The angular velocity sensor may detect respective change speeds of a rotation angle (a roll angle) around an axis extending in the longitudinal direction of the vehicle body, a rotation angle (a pitch angle) around an axis extending in the width direction of the vehicle, and a rotation angle (a yaw angle) around an axis extending in the height direction of the vehicle body. The angular velocity sensor may be a yaw rate sensor that detects the change speed of the yaw angle.

The data measured by the vehicle behavior measurer 11 may be variable with a steering operation, an accelerator operation, and a brake operation that are performed by the driver, and may be transmitted as the data indicating the behavior of the vehicle to the data processing device 50. The data processing device 50 may be configured to acquire the data measured by the vehicle behavior measurer 11. The vehicle behavior measurer 11 may include a sensor configured to measure data that reflects the behavior of the vehicle, in addition to the vehicle speed sensor, the acceleration rate sensor, and the angular velocity sensor.

(2-2. Inputting Device)

The inputting device 13 may receive an input of an operation performed by a user, and transmit the received input to the data processing device 50. For example, the inputting device 13 may be a touch panel display or a dial operation device. In some embodiments, the inputting device 13 may be a voice recognition device that receives a voice input by an occupant of the vehicle, or an image recognition device that receives a gesture input.

In the present example embodiment, the inputting device 13 may receive an input of information on attributes of the driver. The information on the attributes of the driver may be information related to the driving skills of the driver, and may include information including one or more of, for example, an age of the driver, the number of years elapsing after acquisition of a driver's license, frequency of driving, and the number of years elapsing after the latest driving. The information on the attributes of the driver may further include any other information that enables estimation of the driving skills of the driver. Such information may be inputted by a person such as the driver answering questions in a questionnaire presented by the data processing device 50. In some embodiments, data on such information determined or accumulated in advance may be inputted.

The inputting device 13 may also receive an input of information on a sound desired as an output sound. For example, the inputting device 13 may allow a person such as the driver to select a desired sound from among various kinds of timbre or sounds presented by the data processing device 50. For example, kinds of musical instrument sounds or sound effects to be outputted may be selectable. Data on the selectable sounds may be held in advance in the storage 55 of the data processing device 50. In some embodiments, the data on the selectable sounds may be updatable or addable through communication with an external storage such as a server.

When a control condition is set not to change depending on the attributes of the driver or when the output sound is set to be unselectable, the inputting device 13 may not be provided.

(2-3. Surrounding Situation Detector)

The surrounding situation detector 15 may detect a surrounding situation of the vehicle. For example, the surrounding situation detector 15 may include one or more of a stereo camera, a monocular camera, an ultrasonic camera, light detection and ranging/laser imaging detection and ranging (LiDAR), and a radar sensor. The driver assistance apparatus 1 illustrated in FIG. 1 may include a pair of left and right stereo cameras as the surrounding situation detector 15.

The surrounding situation detector 15 may detect objects around the vehicle, based on measured data, and calculate distances to the objects, relative positions of the objects, and relative speeds of the objects. Non-limiting examples of the objects around the vehicle include another vehicle, a bicycle, a pedestrian, a road sign, and any other obstacle. The surrounding situation detector 15 may also detect the surrounding situation of the vehicle, such as a road width or a road shape, based on the measured data. Data on the surrounding situation detected by the surrounding situation detector 15 may be transmitted to the data processing device 50. The data processing device 50 may be configured to acquire the data detected by the surrounding situation detector 15.

In some embodiments, alternatively or in addition to the stereo camera, the monocular camera, the ultrasonic camera, the LiDAR, and the radar sensor, the surrounding situation detector 15 may include any other sensor configured to detect the surrounding situation of the vehicle. Further, alternatively or in addition thereto, the surrounding situation detector 15 may include a rain sensor that detects rainfall, or an anemometer that detects a wind speed. Furthermore, the surrounding situation detector 15 may include a communicator that communicably couples the data processing device 50 and an external server that provides data on the surrounding situation of the vehicle.

(2-4. Position Detection Sensor)

The position detection sensor 17 may receive positioning signals transmitted from satellites of a global navigation satellite system (GNSS) such as Global Positioning System (GPS), and thereby detect a position of the vehicle. The position of the vehicle may be acquired as, for example, data on latitude and longitude on the Earth. The position detection sensor 17 may receive positioning signals transmitted from any other system such as Quasi-Zenith Satellite System, instead of or in addition to the GNSS, and thereby detect the position of the vehicle. Data on the position of the vehicle detected by the position detection sensor 17 may be transmitted to the data processing device 50. The data processing device 50 may be configured to acquire the data (position data) on the position of the vehicle detected by the position detection sensor 17, and to thereby identify the position of the vehicle on map data.

(2-5. Outputting Device)

The outputting device 21 may output a sound recognizable by the driver. The outputting device 21 may be a speaker provided in the vehicle. In some embodiments, the outputting device 21 may be a speaker dedicated to the driver assistance apparatus 1. In the present example embodiment, the outputting device 21 may include a speaker system including multiple speakers 21*a* to 21*d* provided in the vehicle. The data processing device 50 may control an output of the outputting device 21, thereby allowing the driver to recognize the behavior stability of the vehicle through the auditory stimulation.

(2-6. Data Processing Device)

The data processing device 50 may include a communicator 51, a processor 53, the storage 55, an audio source data storage 57, and a map data storage 59. The processor 53 may include an obtainer 61, a sensitivity determiner 63, an audio source selector 65, a data processing unit 67, a behavior stability determiner 69, a reproduction condition setter 71, and an audio source reproduction processing unit 73. The processor 53 may be a processor such as a CPU or any other device having a processing functionality. Each of the obtainer 61, the sensitivity determiner 63, the audio source selector 65, the data processing unit 67, the behavior stability determiner 69, the reproduction condition setter 71, and the audio source reproduction processing unit 73 may operate when the processor executes a program. In some embodiments, some of the obtainer 61, the sensitivity determiner 63, the audio source selector 65, the data processing unit 67, the behavior stability determiner 69, the reproduction condition setter 71, and the audio source reproduction processing unit 73 may be analog circuitry. In one embodiment, the audio source data storage 57 may serve as an "audio source data storage".

(Storage)

The storage 55 may include one or more storage devices such as a RAM or a ROM. The storage 55 may hold data such as acquired data or data on a calculation result, in addition to a program to be executed by the processor 53 and various parameters to be used in executing the program. Apart of the storage 55 may serve as a work area of the processor 53.

(Audio Source Data Storage)

The audio source data storage 57 includes any recording medium communicably coupled to the processor 53. The audio source data storage 57 holds the multiple audio source data items each including the multiple bars or the multiple parts and each classified in accordance with the noticeability of the change in the reproduction method. The audio source data storage 57 may also hold bar list data for each of the audio source data items held in the audio source data storage 57.

FIG. 3 illustrates an example of the bar list data. An audio source data item having the illustrated bar list data may include fourteen bars (numbered zero to thirteen). The bars may each have an equal length (time period) of ten seconds. The bar list data may include data on a start position (seconds) and an end position (seconds) of each of the bars, provided that a start position of the audio source data item is set to a reference (of zero seconds). The audio source data storage 57 may hold the bar list data corresponding to the respective audio source data items held in the audio source data storage 57.

In the present example embodiment, the noticeability of the change in the reproduction method may be classified into the four levels, i.e., "difficult to notice", "slightly difficult to notice", "slightly easy to notice", and "easy to notice", and at least one music piece may be set for each of the levels of the noticeability. In an example of the following description, to facilitate understanding of the technology according to the example embodiment of the disclosure, one music piece of the audio source data items may be held for each of the levels of the noticeability.

(Map Data Storage)

The map data storage 59 may be a storage device that holds the map data. The map data may include various kinds of traffic-related data, such as a road width, a road gradient, the number of travel lanes, a speed limit, or a traffic regulation sign, as well as data including a terrain, a road type, a road shape, a building, a traffic signal installation position, and a crosswalk. The various kinds of the data included in the map data may be associated with, for example, position coordinates of latitude and longitude on the Earth. In some embodiments, the map data storage 59 may be a part of the storage 55 incorporated in the data processing device 50, or may be implemented by an in-vehicle storage device or an external server communicably coupled to the data processing device 50.

(Communicator)

The communicator 51 may be an interface that performs transmission and reception of data and signals with the vehicle behavior measurer 11, the inputting device 13, and the outputting device 21.

(Obtainer)

The obtainer 61 of the processor 53 may acquire the data transmitted from the vehicle behavior measurer 11 and the inputting device 13, via the communicator 51. The data acquired by the obtainer 61 may include the data indicating the behavior of the vehicle having been outputted from the vehicle behavior measurer 11. The obtainer 61 may acquire the data in a predetermined calculation cycle and store the acquired data in the storage 55. Further, the obtainer 61 acquires data on the sensitivity of the driver of the vehicle to the change in the reproduction method. In the present example embodiment, the obtainer 61 may read the data on the sensitivity of the driver to the change in the reproduction method, having been determined by the sensitivity determiner 63 and held in the storage 55.

(Sensitivity Determiner)

The sensitivity determiner 63 of the processor 53 may determine the sensitivity of each of drivers who drive the vehicle to the change in the reproduction method. In the present example embodiment, the sensitivity determiner 63 may determine a degree of a change appearing in the behavior stability of the vehicle before and after the audio source reproduction processing unit 73 has changed the reproduction method of the audio source data item. For example, the sensitivity determiner 63 may define a ratio of the number of changes appearing in the behavior stability of the vehicle to the number of changes in the reproduction method of the audio source data item, as the sensitivity to the change in the reproduction method. Because the determination is made to determine whether the driver has recognized the change in the reproduction method, the sensitivity determiner 63 may simply determine whether a change has occurred in the behavior stability, regardless of whether the behavior stability of the vehicle has improved or deteriorated.

The sensitivity determiner 63 may store, in the storage 55, data on a determination result as being associated with identification data on the driver. For example, the sensitivity determiner 63 may distinguish the driver, based on information on the driver inputted by the driver via the inputting device 13, and store, in the storage 55, the data on the determination result of the sensitivity to the change in the reproduction method as being associated with the identification data such as an identification number. In some embodiments where the vehicle is provided with an in-vehicle imaging camera configured to capture an image of the driver, the sensitivity determiner 63 may distinguish the driver, based on a facial feature quantity of the driver extracted from data on the image captured by the in-vehicle imaging camera.

Note that the determination method performed by the sensitivity determiner 63 on the sensitivity to the change in the reproduction method is not limited to the above-described example, and any determination method may be employed. In some embodiments, a test may be conducted in advance to determine the sensitivity of the driver to the change in the reproduction method, and data on a test result may be held in the storage 55. In this case, the sensitivity determiner 63 may be omittable.

(Audio Source Selector)

The audio source selector 65 of the processor 53 selects an audio source data item to be reproduced, from among the multiple audio source data items, depending on the sensitivity of the driver to the change in the reproduction method. In some embodiments, the audio source selector 65 may select an audio source data item to be reproduced, from among one or more audio source data items set to be selectable depending on the sensitivity, based on the data, held in the storage 55, on the sensitivity of the driver to the change in the reproduction method.

FIG. 4 illustrates an example of a data table in which selectable audio source data items are set depending on the data on the sensitivity to the change in the reproduction method. In the data table illustrated in FIG. 4, a music piece A, a music piece B, a music piece C, and a music piece D may be each allocated based on the noticeability of the change in the reproduction method, and may be each set to a selectable music piece or an unselectable music piece depending on the sensitivity of each of users to the change in the reproduction method. The music piece A may be a music piece whose change in the reproduction method is difficult to notice, the music piece B may be a music piece whose change in the reproduction method is slightly difficult to notice, the music piece C may be a music piece whose change in the reproduction method is slightly easy to notice, and the music piece D may be a music piece whose change in the reproduction method is easy to notice.

For the driver who has "high" sensitivity to the change in the reproduction method, all of the audio source data items, i.e., the music piece A to the music piece D, may be selectable. For the driver who has "slightly high" sensitivity to the change in the reproduction method, the audio source data items other than the music piece A whose change in the reproduction method is difficult to notice, i.e., the music piece B to the music piece D, may be selectable. For the driver who has "slightly low" sensitivity to the change in the reproduction method, the audio source data items of the music piece C whose change in the reproduction method is slightly easy to notice and the music piece D whose change in the reproduction method is easy to notice may be selectable. For the driver who has "low" sensitivity to the change in the reproduction method, the audio source data item of the music piece D whose change in the reproduction method is easy to notice may be selectable.

The audio source selector 65 selects an audio source data item to be reproduced, depending on the sensitivity of the driver to the change in the reproduction method, based on the data table. Such a configuration helps to enhance reliability in allowing the driver to notice the change in the reproduction method of the audio source data item being reproduced and to thereby recognize a decrease in the behavior stability of the vehicle during the driving by the driver. This helps to direct the driver's attention toward a driving operation leading to improvement in the behavior stability of the vehicle and to thereby improve skills in the driving operation of the vehicle.

(Data Processing Unit)

The data processing unit 67 of the processor 53 may execute predetermined data processing on the data indicating the behavior of the vehicle having been acquired by the obtainer 61. In some embodiments, the data processing unit 67 may execute one or more of smoothing processing, absolute value conversion processing, and differential processing on the acquired measured data on a vehicle speed, the acceleration rate (the longitudinal acceleration rate, the lateral acceleration rate, or the vertical acceleration rate), or an angular velocity (an angular velocity of the yaw angle, an angular velocity of the roll angle, or an angular velocity of the pitch angle), and thereby calculate an index value serving as a value indicating a magnitude of the behavior of the vehicle.

For example, the data processing unit 67 may execute the smoothing processing, the absolute value conversion processing, and the differential processing on the measured data on the vehicle speed, the acceleration rate, or the angular velocity, and thereby calculate an absolute value of the acceleration rate, a jerk of the absolute value of the acceleration rate, or a jerk (an angular acceleration rate) of an absolute value of the angular velocity. The calculated absolute value of each of the acceleration rate, the angular velocity, the jerk of the acceleration rate, and the angular acceleration rate may be larger as the behavior of the vehicle is larger, while being smaller as the behavior of the vehicle is smaller. The calculated absolute value may be used as the index value indicating the magnitude of the behavior of the vehicle. In some embodiments, using the absolute value of the jerk of the acceleration rate or the absolute value of the angular acceleration rate as the index value helps to reduce an influence of a trajectory of a travel route or acceleration and deceleration of another vehicle on a change in the vehicle speed, the acceleration rate, or the angular velocity. This helps to achieve more accurate evaluation of a change in the behavior of the vehicle attributed to the driving operation state produced by the driver.

FIG. 5 is an explanatory chart illustrating an example of data conversion processing to be performed by the data processing unit 67. Illustrated in FIG. 5 is an example in which the index value indicating the magnitude of the behavior of the vehicle is calculated using a value of a lateral jerk calculated based on the measured data on the lateral acceleration rate detected by the acceleration rate sensor serving as a part of the vehicle behavior measurer 11. In some embodiments, the data processing unit 67 may execute the smoothing processing and the absolute value conversion processing on the measured data on the lateral acceleration rate detected by the acceleration rate sensor, and thereby convert the measured data on the lateral acceleration rate into data on an absolute value of the lateral acceleration rate. The data processing unit 67 may further execute time differential processing on the data on the absolute value of the lateral acceleration rate, thereby convert the measured data on the lateral acceleration rate into data on an absolute value of the lateral jerk, and set the converted data to the index value.

In some embodiments, the data processing unit 67 may calculate one index value using multiple data pieces out of the respective absolute values of the acceleration rate, the angular velocity, the jerk of the acceleration rate, and the angular acceleration rate. In this case, the data processing unit 67 may replace respective values of the data pieces to be used with values of the same index (e.g., into values in the range from 0 to 100), and set, to the index value, an average value of the values obtained as a result of the replacement of the values of all of the data pieces to be used with the values of the same index. In this case, the respective kinds of data pieces may be weighted.

In the present example embodiment, description will be given of an example in which the data processing unit 67 acquires the measured data on the lateral acceleration rate detected by the acceleration rate sensor, and calculates the lateral jerk as the index value indicating the magnitude of the behavior of the vehicle.

(Behavior Stability Determiner)

The behavior stability determiner 69 of the processor 53 executes a process of determining the behavior stability of the vehicle (hereinafter, also referred to as a "behavior stability determination process") while the driver is driving the vehicle. In the present example embodiment, the behavior stability determiner 69 may determine the behavior stability of the vehicle by comparing the index value indicating the magnitude of the behavior of the vehicle, having been calculated during the traveling of the vehicle, with a predetermined threshold. For example, in the present example embodiment, if the number of times when the index value has exceeded the predetermined threshold reaches a predetermined reference number of times, the behavior stability determiner 69 may determine that the behavior stability of the vehicle is in a low state.

Further, each time the vehicle has traveled for a predetermined time period with the behavior stability of the vehicle being in a high state, the behavior stability determiner 69 may generate an evaluation signal indicating a determination result of the behavior stability. For example, the behavior stability determiner 69 may generate the evaluation signal, each time the predetermined time period elapses with the number of times when the index value has exceeded the predetermined threshold not reaching the predetermined reference number of times after a start of counting of the predetermined time period. The counting of the predetermined time period may be reset when the predetermined time period elapses, and counting up may be performed again.

The predetermined time period for the determination as to whether the behavior stability of the vehicle is maintained in the high state is set to a time period corresponding to each of the bars or parts of the audio source data item to be used. For example, the behavior stability determiner 69 may refer to the bar list data of the audio source data item selected by the audio source selector 65, and set an end of the bar being reproduced to an end point of the predetermined time period. When the bars of the audio source data item have respective lengths different from each other, the predetermined time period for the determination as to whether the behavior stability of the vehicle is maintained in the high state may also vary in length.

The behavior stability determiner 69 may set the threshold to be used for the determination of the behavior stability of the vehicle, based on a level of the driving skills of each of the drivers. At a lower threshold, the behavior of the vehicle may be further decreased to enhance the behavior stability. This helps to guide the driver to further stabilization of the behavior of the vehicle. In place of or in addition to the threshold, the reference number of times to be used for the determination of the behavior stability of the vehicle may also be set based on the level of the driving skills of the driver.

For example, the behavior stability determiner 69 may set the threshold to a lower value as the driving skills of the driver are higher, and set the threshold to a higher value as the driving skills of the driver are lower. For example, for the driver who has high driving skills to achieve stable behavior of the vehicle, the threshold may be set to a low value. Accordingly, for the determination of the behavior stability as being high, it is necessary for the driver who has the high driving skills to further decrease the behavior of the vehicle, as compared with the driver who has low driving skills. Such a configuration helps to guide the driver who has the high driving skills to further stabilization of the behavior of the vehicle. In contrast, the configuration helps to guide the driver who has the low driving skills to an appropriate level of the behavior stability, corresponding to the driving skills of the driver.

The behavior stability determiner 69 may estimate the driving skills of the driver, based on the information including one or more of, for example, the age of the driver, the number of years elapsing after the acquisition of the driver's license, the frequency of driving, and the number of years elapsing after the latest driving. For example, when the age of the driver belongs to an old age, for example, of seventy years old or more, the threshold may be made higher, because the driving skills are highly likely to be decreased. Further, as the number of years elapsing after the acquisition of the driver's license is larger, the threshold may be made lower, because the driving skills are estimated to be high. Furthermore, as the frequency of driving is higher, the threshold may be made lower, because the driving skills are estimated to be high. In addition, as the number of years (years of gap) elapsing after the latest driving is larger, the threshold may be made higher, because the driving skills are highly likely to be decreased. The information on the attributes of the driver may be information inputted via the inputting device 13.

Moreover, the behavior stability determiner 69 may estimate the driving skills of the driver, based on data on the behavior stability in past driving by the driver. For example, the behavior stability determiner 69 may use data on the number of times when or frequency at which the index value calculated by the data processing unit 67 has exceeded the threshold in the past driving by the driver. In this case, as the number of times when the index value has exceeded the threshold is smaller or as the frequency at which the index value has exceeded the threshold is lower, the threshold may be made lower, because the driving skills are estimated to be high.

Further, the behavior stability determiner 69 may set a condition for the data processing to be performed by the data processing unit 67, based on the data on the driving skills of the driver. For example, the behavior stability determiner 69 may set the number of kinds of the data to be used when the data processing unit 67 calculates the index value indicating the magnitude of the behavior of the vehicle, based on the data on the driving skills of the driver. In some embodiments, the behavior stability determiner 69 may increase the kinds of the data to be used for the calculation of the index value (hereinafter, also referred to as "data usable for evaluation of the behavior stability"), as the driving skills of the driver are higher, and decrease the kinds of the data to be used for the calculation of the index value, as the driving skills of the driver are lower. For example, for the driver who has the high driving skills to achieve the stable behavior of the vehicle, the behavior stability may be determined based on more kinds of the data. This helps to guide the driver who has the high driving skills to further stabilization of the behavior of the vehicle. In contrast, for the driver who has the low driving skills, the behavior stability may be determined based on relatively fewer kinds of the data. This helps to guide the driver who has the low driving skills to the appropriate level of the behavior stability, corresponding to the driving skills of the driver.

Note that, even when the kinds of the data to be used for the calculation of the index value are increased or decreased, using data on the lateral jerk or the angular acceleration rate of the yaw angle preferentially regardless of the number of kinds of the data to be used may allow for easy evaluation of the steering operation state produced by the driver. In addition, using data on a longitudinal jerk or the angular acceleration rate of the roll angle preferentially may allow for easy evaluation of the accelerator operation state and the brake operation state that are produced by the driver.

FIG. 6 is an explanatory diagram illustrating an example of a method of setting the reference number of times and the threshold that are based on the information on the attributes of the driver as information that enables estimation of the driving skills, and an example of a method of increasing and decreasing the kinds of the data to be used for the calculation of the index value.

Referring to FIG. 6, when the age of the driver belongs to the old age exceeding a predetermined age, the threshold may be made higher by a predetermined number, and the kinds of the data to be used for the calculation of the index value may be decreased. Further, as the number of years elapsing after the acquisition of the driver's license is larger, the threshold may be made lower by the predetermined number, and the kinds of the data to be used for the calculation of the index value may be increased. In contrast, as the number of years elapsing after the acquisition of the driver's license is smaller, the threshold may be made higher by the predetermined number, and the kinds of the data to be used for the calculation of the index value may be decreased. Furthermore, as the frequency of driving is higher, the threshold may be made lower by the predetermined number, and the kinds of the data to be used for the calculation of the index value may be increased. In contrast, as the frequency of driving is lower, the threshold may be made higher by the predetermined number, and the kinds of the data to be used for the calculation of the index value may be decreased. In addition, as the number of years (years of gap) elapsing after the latest driving is larger, the threshold may be made higher by the predetermined number, and the kinds of the data to be used for the calculation of the index value may be decreased.

For example, when the behavior stability is evaluated using a single threshold, the behavior stability determiner 69 may increase or decrease the threshold with respect to a reference value set in advance for the threshold, based on the information on the attributes of the driver, and increase or decrease the kinds of the data to be used for the calculation of the index value. For example, when the index value is calculated as an index value in the range from 0 to 100 both inclusive, the threshold may be increased or decreased by setting the reference value of the threshold to 50 and multiplying the reference value by a coefficient of less than 1 or a coefficient of greater than 1, based on each of pieces of the information on the attributes of the driver. Alternatively, when the data usable for the evaluation of the behavior stability includes twelve kinds of data including the longitudinal acceleration rate, the lateral acceleration rate, the vertical acceleration rate, the angular velocity of the yaw angle, the angular velocity of the pitch angle, the angular velocity of the roll angle, the longitudinal jerk, the lateral jerk, a vertical jerk, the angular acceleration rate of the yaw angle, an angular acceleration rate of the pitch angle, and the angular acceleration rate of the roll angle, the number of kinds of the data to be used may be set by setting a reference number of kinds of the data to five and increasing or decreasing the kinds of the data by one, based on each of the pieces of the information on the attributes of the driver.

Instead of increasing or decreasing the threshold, the reference number of times may be increased or decreased. In some embodiments, both the threshold and the reference number of times may be changed. In some embodiments, the coefficient used to increase or decrease the threshold, a coefficient used to increase or decrease the reference number of times, and the number of times of increasing or decreasing the kinds of the data to be used for the evaluation of the behavior stability may be constant regardless of the information on the attributes of the driver, or may be weighted depending on the information on the attributes of the driver. Note that the number of thresholds and the number of kinds of the data to be used for the evaluation of the behavior stability may be each increased or decreased within a range between a maximum value and a minimum value that are set in advance.

(Reproduction Condition Setter)

The reproduction condition setter 71 of the processor 53 may execute a reproduction condition setting process of setting the reproduction sound volume and the reproduction speed of the audio source data item to be reproduced by the audio source reproduction processing unit 73. The driver assistance apparatus 1 according to the present example embodiment allows the driver to recognize the behavior stability of the vehicle by making the driver hear the audio source data item. Accordingly, in a situation where the driver is difficult to notice the change in the reproduction method of the audio source data item, effects of the assistance process can be decreased. Therefore, if an actual surrounding situation of the traveling vehicle is a predetermined surrounding situation that makes the change in the reproduction method difficult to notice, the reproduction condition setter 71 may determine the reproduction sound volume or the reproduction speed of the audio source data item depending on the actual surrounding situation.

For example, the reproduction condition setter 71 may determine whether the actual surrounding situation is a situation where an amount of the driving operation or the number of driving operation tasks to be performed by the driver is large, as the predetermined surrounding situation that makes the change in the reproduction method difficult to notice. In some embodiments, when the data on the surrounding situation of the vehicle having been transmitted from the surrounding situation detector 15 indicates that another vehicle, a pedestrian, a bicycle, or any other traffic participant around the vehicle is large in number, the reproduction condition setter 71 may determine that the actual surrounding situation is the situation where an operation amount or the number of operation tasks is large of the acceleration operation, the deceleration operation, and the steering operation of the vehicle.

Further, the reproduction condition setter 71 may determine whether the actual surrounding situation is one of a situation where a sound around the vehicle is large, a situation where a traveling sound of the vehicle is large, a situation where rainfall is high, or a situation where a wind speed is high, as the predetermined surrounding situation that makes the change in the reproduction method difficult to notice. In some embodiments, the reproduction condition setter 71 may determine whether the actual surrounding situation is the situation where the sound around the vehicle is large, the situation where the traveling sound of the vehicle is large, the situation where the rainfall is high, or the situation where the wind speed is high, based on the data on the surrounding situation of the vehicle having been transmitted from the surrounding situation detector 15.

In some embodiments, the reproduction condition setter 71 may estimate the actual surrounding situation of the traveling vehicle, based on the position data on the vehicle having been detected by the position detection sensor 17 and the data held in the map data storage 59, in addition to the data on the surrounding situation of the vehicle having been transmitted from the surrounding situation detector 15.

If determining that the actual surrounding situation of the vehicle falls under the predetermined surrounding situation, the reproduction condition setter 71 may increase the reproduction sound volume or the reproduction speed of the audio source data item being reproduced. Increasing the reproduction sound volume may allow the driver to more easily hear the audio source data item and to thereby more easily notice the change in the reproduction method of the audio source data item. Meanwhile, increasing the reproduction speed may shorten a reproduction time period of each of the bars and thereby increase frequency at which the reproduction method is changed, thus allowing the driver to more easily notice the change in the reproduction method of the audio source data item.

Note that, for a frequent change in the reproduction sound volume or the reproduction speed not to hinder distinction between a change made to a reproduction condition in light of the behavior stability of the vehicle and a change made to the reproduction sound volume or the reproduction speed in light of a change in the surrounding situation, a minimum time period may be set during which the reproduction sound volume or the reproduction speed is maintained. The reproduction condition setter 71 may not change the reproduction sound volume or the reproduction speed in light of the change in the surrounding situation until the minimum time period elapses after the reproduction sound volume or the reproduction speed is set.

(Audio Source Reproduction Processing Unit)

The audio source reproduction processing unit 73 of the processor 53 executes an audio source reproduction process as follows. When the behavior of the vehicle is stable, the audio source reproduction processing unit 73 reproduces the audio source data item by the normal reproduction way at the constant reproduction sound volume and at the constant reproduction speed while causing the bars or the parts to proceed in the predetermined order. When the behavior of the vehicle is unstable, the audio source reproduction processing unit 73 reproduces the audio source data item by the other reproduction way different from the normal reproduction way. For example, in the other reproduction way different from the normal reproduction way when the behavior of the vehicle is unstable, the audio source reproduction processing unit 73 may reproduce the bars or the parts in an order different from the predetermined order, or may reproduce the audio source data item at the changed reproduction sound volume or at the changed reproduction speed.

With such a configuration, while the driver continues driving with the behavior stability of the vehicle being in the high state, the audio source data item is reproduced by the normal reproduction way at the constant reproduction sound volume and at the constant reproduction speed. This helps to allow the driver to comfortably hear the audio source data item with no strangeness. In contrast, when the behavior stability of the vehicle is decreased, the audio source data item is reproduced by the other reproduction way different from the normal reproduction way, thus making the driver feel strangeness with the audio source data item. This helps to direct the driver's attention toward maintaining high behavior stability of the vehicle and to thereby enhance motivation to improve the driving skills.

A basic reproduction sound volume in the normal reproduction way may be set by a person such as the driver, or may be a fixed value set in advance. A basic reproduction speed in the normal reproduction way may be a speed set in advance depending on each of the audio source data items. The reproduction sound volume in the normal reproduction way and the reproduction speed in the normal reproduction way may be respectively a reproduction sound volume and a reproduction speed that are changed by the reproduction condition setter 71 respectively from the basic reproduction sound volume and the basic reproduction speed depending on the surrounding situation of the vehicle.

In the present example embodiment, if the behavior stability determiner 69 generates the evaluation signal at an end time of each of the bars of the audio source data item after a start of the reproduction of the audio source data item, the audio source reproduction processing unit 73 continues to reproduce the audio source data item by the normal reproduction way while causing the bars to proceed. If the behavior stability determiner 69 generates no evaluation signal at the end time of each of the bars of the audio source data item, the audio source reproduction processing unit 73 reproduces the audio source data item by the other reproduction method different from the normal reproduction way.

In some embodiments, the audio source reproduction processing unit 73 may additionally change one or more of the reproduction speed and the reproduction sound volume, when repeating the same bar. In some embodiments, when the behavior of the vehicle does not stabilize even if the same bar is repeated for a predetermined number of times, the audio source reproduction processing unit 73 may additionally and sequentially change the reproduction speed or the reproduction sound volume. This helps to gradually increase the strangeness felt by the driver, thereby allowing the driver to recognize that a time period during which the behavior of the vehicle is unstable becomes long.

Figure 7:
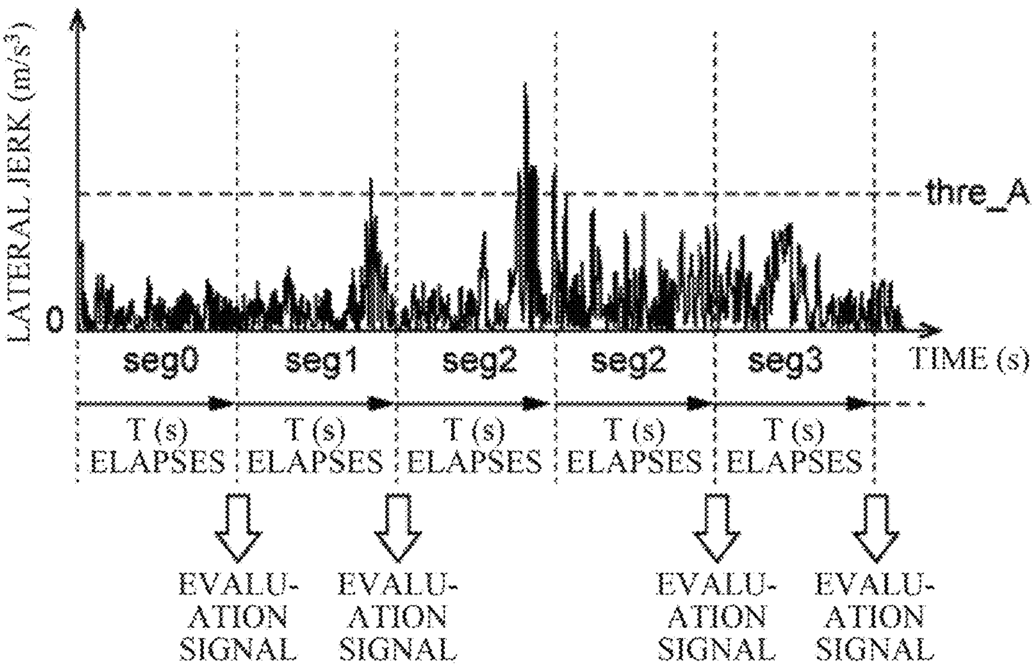
FIG. 7 is an explanatory chart illustrating an example of a behavior stability determination process and an audio source reproduction process according to one example embodiment of the disclosure.

FIG. 7 is an explanatory chart illustrating an example of the behavior stability determination process to be performed by the behavior stability determiner 69 and the audio source reproduction process to be performed by the audio source reproduction processing unit 73. Illustrated in FIG. 7 is an example in which the behavior stability determiner 69 generates the evaluation signal, each time the vehicle has traveled with the behavior stability of the vehicle being in the high state during each of the bars. In FIG. 7, "seg" denotes each of the bars.

When the audio source reproduction processing unit 73 starts the reproduction of the audio source data item at a reproduction speed set in advance and at a reproduction sound volume set by a person such as the driver, the behavior stability determiner 69 may determine whether the absolute value (the index value) of the lateral jerk has exceeded a threshold thre_A during driving of the vehicle.

The behavior stability determiner 69 may count the number of times when the index value has exceeded the threshold thre_A during a reproduction time period T (seconds) of each of bars seg. In the example illustrated in FIG. 7, the reference number of times may be set to four, to allow the behavior stability of the vehicle to be determined to be in the low state if the number of times when each index value has exceeded the threshold thre_A reaches four.

When the reproduction time period T (seconds) has elapsed with the index value not exceeding the threshold thre_A during a bar seg0 having a bar number of zero, the behavior stability determiner 69 may generate the evaluation signal at an end time of the bar seg0. Upon generation of the evaluation signal, the audio source reproduction processing unit 73 may cause the audio source data item to proceed to the next bar seg1 as a bar to be reproduced, while maintaining the reproduction speed. The audio source reproduction processing unit 73 may also maintain the reproduction sound volume unless setting of the reproduction sound volume is changed.

Thereafter, when the reproduction time period T (seconds) has elapsed while the number of times when the index value has exceeded the threshold thre_A during the bar seg0 having a bar number of zero is one, that is, does not reach to four, the behavior stability determiner 69 may generate the evaluation signal at an end time of the bar seg1. Upon generation of the evaluation signal, the audio source processing unit 73 may cause the audio source data item to proceed to the next bar seg2 as the bar to be reproduced, while maintaining the reproduction speed. The audio source processing unit 73 may also maintain the reproduction sound volume unless the setting of the reproduction sound volume is changed.

Thereafter, when the number of times when the index value has exceeded the threshold thre_A is four or more during the bar seg2 having a bar number of two, the behavior stability determiner 69 may generate no evaluation signal at an end time of the bar seg2. Upon ending of a reproduction time period of the bar seg2 without generating the evaluation signal, the audio source reproduction processing unit 73 may repeat the reproduction of the same bar seg2. In FIG. 7, the audio source reproduction processing unit 73 may maintain the reproduction speed; however, this is a non-limiting example. In some embodiments, the audio source reproduction processing unit 73 may change the reproduction speed, and may additionally change the reproduction sound volume.

When the reproduction time period T (seconds) has elapsed with the index value not exceeding the threshold thre_A during the bar seg2 reproduced the second time, the behavior stability determiner 69 may generate the evaluation signal at an end time of the bar seg2. Upon generation of the evaluation signal, the audio source reproduction processing unit 73 may cause the audio source data item to proceed to the next bar seg3 as the bar to be reproduced, while maintaining the reproduction speed. At this time, in a case where the reproduction speed or the reproduction sound volume has been changed, the audio source reproduction processing unit 73 may return the reproduction speed and the reproduction sound volume respectively to a pre-change speed and a pre-change sound volume.

Thereafter, when the reproduction time period T (seconds) has elapsed with the index value not exceeding the threshold thre_A also during the bar seg3 having a bar number of three, the behavior stability determiner 69 may generate the evaluation signal at an end time of the bar seg3. Upon generation of the evaluation signal, the audio source reproduction processing unit 73 may cause the audio source data item to proceed to the next bar seg4 as the bar to be reproduced, while maintaining the reproduction speed. The audio source reproduction processing unit 73 may also maintain the reproduction sound volume unless the setting of the reproduction sound volume is changed.

As described above, the behavior stability determiner 69 may determine the behavior stability of the vehicle for each of the bars to be reproduced, after the start of the reproduction of the audio source data item. If determining that the behavior of the vehicle has continued to be in a stable state, the behavior stability determiner 69 may generate the evaluation signal. Further, if the behavior stability determiner 69 generates the evaluation signal at the end time of each of the bars during the reproduction of the audio source data item, the audio source reproduction processing unit 73 may cause the audio source data item to proceed to the next bar as the bar to be reproduced. If the behavior stability determiner 69 generates no evaluation signal, the audio source processing unit 73 may repeatedly reproduce the same bar. This helps to direct the driver's attention toward maintaining the high behavior stability of the vehicle and to thereby enhance motivation to improve the driving skills.

3. Process Operation by Driver Assistance Apparatus

The description has been given above of the configuration example of the driver assistance apparatus 1 according to the present example embodiment. Next, a process operation to be performed by the driver assistance apparatus 1 will be described by way of example.

Figure 8:
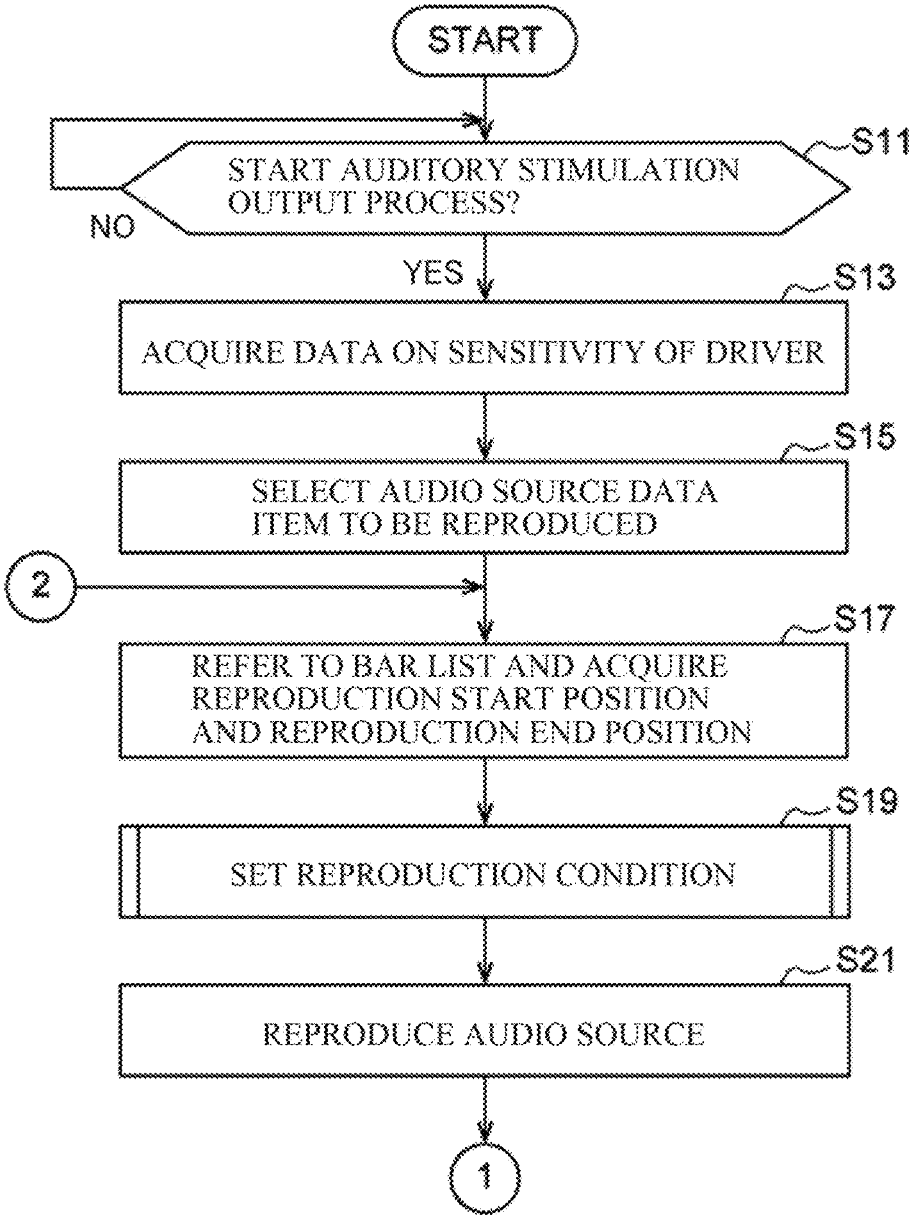
FIG. 8 is a flowchart illustrating a main routine of a control process according to one example embodiment of the disclosure.
Figure 9:
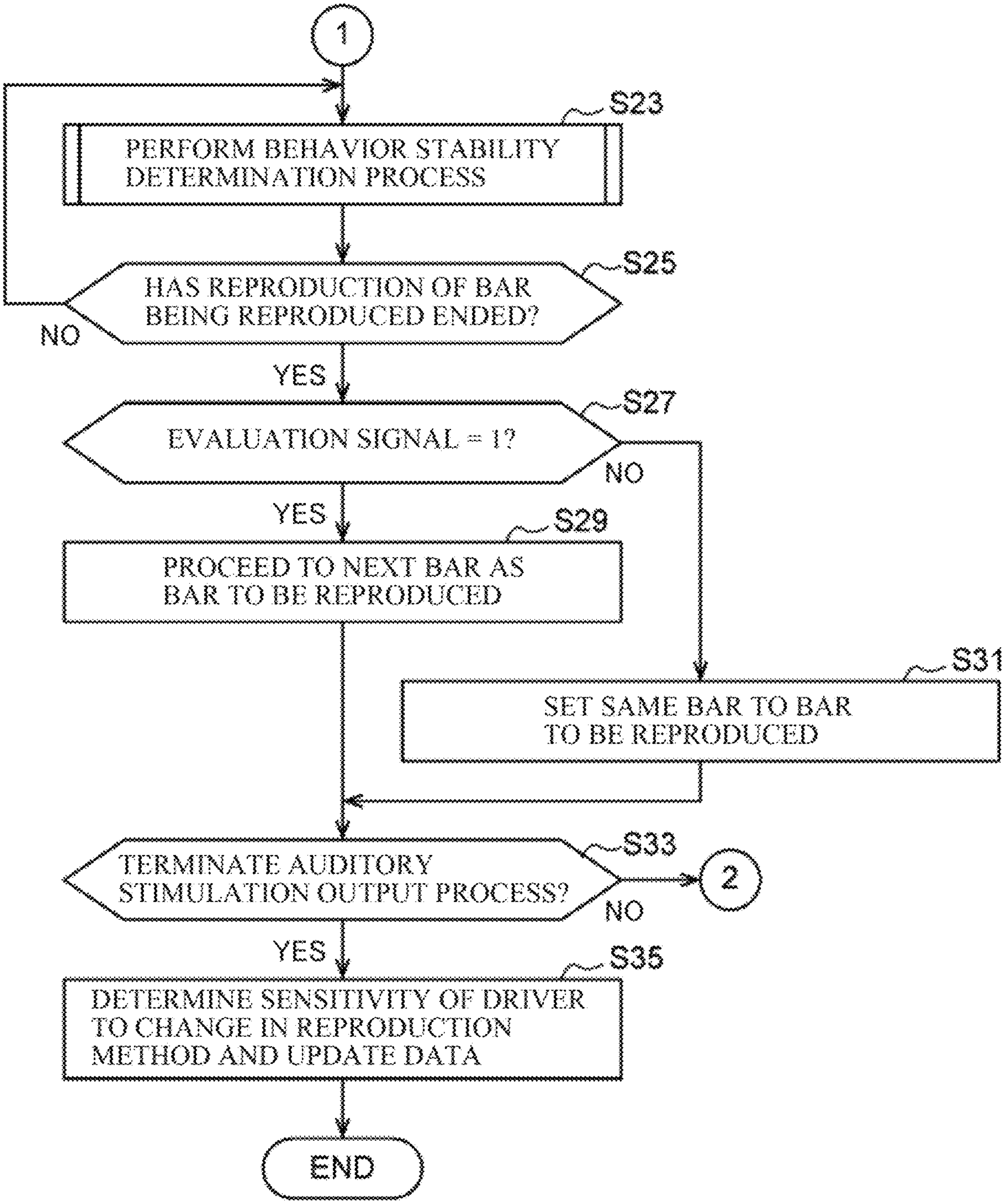
FIG. 9 is a flowchart illustrating a subsequent main routine of the control process illustrated in FIG. 8.

FIGS. 8 and 9 are each a flowchart illustrating a routine of a process to be performed by the processor 53 of the data processing device 50.

First, the processor 53 may determine whether to start execution of a process of presenting the behavior stability produced by the driver to the driver through the auditory stimulation (hereinafter, also referred to as an "auditory stimulation output process") (step S11). A condition for starting the execution of the auditory stimulation output process is not particularly limited. For example, in a case where the auditory stimulation output process is constantly executed while a driving system of the vehicle is operating, the processor 53 may determine that the execution of the auditory stimulation output process is to be started at the time of activating the driving system. In another example, the processor 53 may determine that the execution of the auditory stimulation output process is to be started, when it is detected that the driver has sat on a driver's seat, based on an output signal of a driver imaging camera or of a load sensor installed in the driver's seat. Further, in a case where the driver or any occupant of the vehicle is able to switch on and off the execution of the auditory stimulation output process, the processor 53 may determine that the execution of the auditory stimulation output process is to be started upon switching from off to on the execution of the auditory stimulation output process.

If determining that the execution of the auditory stimulation output process is not to be started (step S11: NO), the processor 53 may repeatedly execute the determination process in step S11. If the processor 53 determines that the execution of the auditory stimulation output process is to be started (step S11: YES), the audio source selector 65 may acquire the data on the sensitivity of the driver to the change in the reproduction method (step S13). For example, the audio source selector 65 may identify the driver, based on the facial feature quantity of the driver extracted from the captured image of the in-vehicle imaging camera or the information on the driver inputted by the driver via the inputting device 13, and may read the data on the sensitivity of the driver to the change in the reproduction method, held in the storage 55 as being associated with the identification data on the driver. Accordingly, the sensitivity of the driver to the change in the reproduction method may be determined to be "low", "slightly low", "slightly high", or "high".

Thereafter, the audio source selector 65 may select an audio source data item to be reproduced, from among the multiple audio source data items held in the audio source data storage 57, depending on the sensitivity of the driver to the change in the reproduction method (step S15). In some embodiments, the audio source selector 65 may refer to the data table illustrated in FIG. 4, and select one music piece from among the selectable music pieces corresponding to the sensitivity of the driver to the change in the reproduction method. From among the selectable music pieces, the audio source selector 65 may select a music piece having been selected the smallest number of times in the past, randomly select a music piece, or select a music piece having a result of the highest behavior stability of the vehicle in past execution of the auditory stimulation output process.

Thereafter, the audio source reproduction processing unit 73 may refer to the bar list data (see FIG. 3) of the selected audio source data item, and acquire a reproduction start position (time) and a reproduction end position (time) of each of the bars to be now reproduced of the audio source data item (step S17). For example, before the start of the reproduction of the audio source data item, the audio source processing unit 73 may acquire data on a reproduction start position (zero seconds) and a reproduction end position (ten seconds) of the bar seg0 having the bar number of zero. After the start of the reproduction of the audio source data item, the audio source reproduction processing unit 73 may acquire data on a reproduction start position (zero seconds) and a reproduction end position (ten seconds) of the bar seg to be reproduced next.

Figure 10:
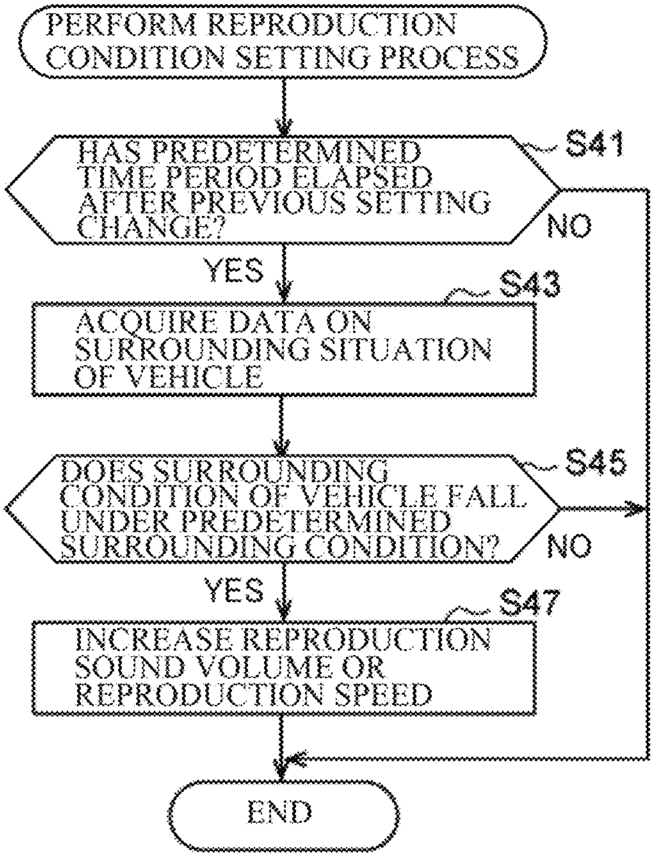
FIG. 10 is a flowchart illustrating a reproduction condition setting process according to one example embodiment of the disclosure.

Thereafter, the reproduction condition setter 71 may set the reproduction sound volume or the reproduction speed of the audio source data item depending on the surrounding situation of the vehicle (step S19). FIG. 10 is a flowchart illustrating the reproduction condition setting process. First, the reproduction condition setter 71 may determine whether a predetermined time period has elapsed after a previous change made to setting of the reproduction condition in the reproduction condition setting process (step S41). The predetermined time period may be set to prevent frequent changes that are otherwise made to the reproduction condition depending on the surrounding situation of the vehicle. For example, the predetermined time period may be set in the range from 60 seconds to 300 seconds both inclusive.

If determining that the predetermined time period has not elapsed after the previous change made to the setting of the reproduction condition in the reproduction condition setting process (step S41: NO), the reproduction condition setter 71 may directly terminate the reproduction condition setting process. If determining that the predetermined time period has elapsed after the previous change made to the setting of the reproduction condition in the reproduction condition setting process (step S41: YES), the reproduction condition setter 71 may acquire the data on the surrounding situation of the vehicle (step S43). In some embodiments, the reproduction condition setter 71 may acquire the data on the surrounding situation having been transmitted from the surrounding situation detector 15. Further, the reproduction condition setter 71 may acquire data on the surrounding situation of the vehicle, based on the position data on the vehicle having been detected by the position detection sensor 17 and the data held in the map data storage 59. In addition, the reproduction condition setter 71 may communicate with a server provided outside the vehicle and thereby acquire the surrounding situation of the vehicle.

Thereafter, the reproduction condition setter 71 may determine whether the actual surrounding situation of the vehicle is the predetermined surrounding situation that makes the change in the reproduction method difficult to notice (step S45). If determining that the actual surrounding situation of the vehicle is not the predetermined surrounding situation that makes the change in the reproduction method difficult to notice (step S45: NO), the reproduction condition setter 71 may set a correction value of each of the reproduction sound volume and the reproduction speed to zero (i.e., not correct the reproduction sound volume and the reproduction speed), and terminate the reproduction condition setting process.

If determining that the actual surrounding situation of the vehicle is the predetermined surrounding situation that makes the change in the reproduction method difficult to notice (step S45: YES), the reproduction condition setter 71 may set the correction value that increases the reproduction sound volume or the reproduction speed (step S47). The correction value that increases the reproduction sound volume or the reproduction speed may be a correction coefficient that increases the reproduction sound volume or the reproduction speed of the selected audio source data item, or may be a correction value to be added. The reproduction condition setter 71 may set the correction value and then terminate the reproduction condition setting process.

Referring back to FIG. 8, the audio source reproduction processing unit 73 may reproduce the selected audio source data item from a reproduction start position (time) of the audio source data item at the set reproduction speed and reproduction sound volume (step S21).

Figure 11:
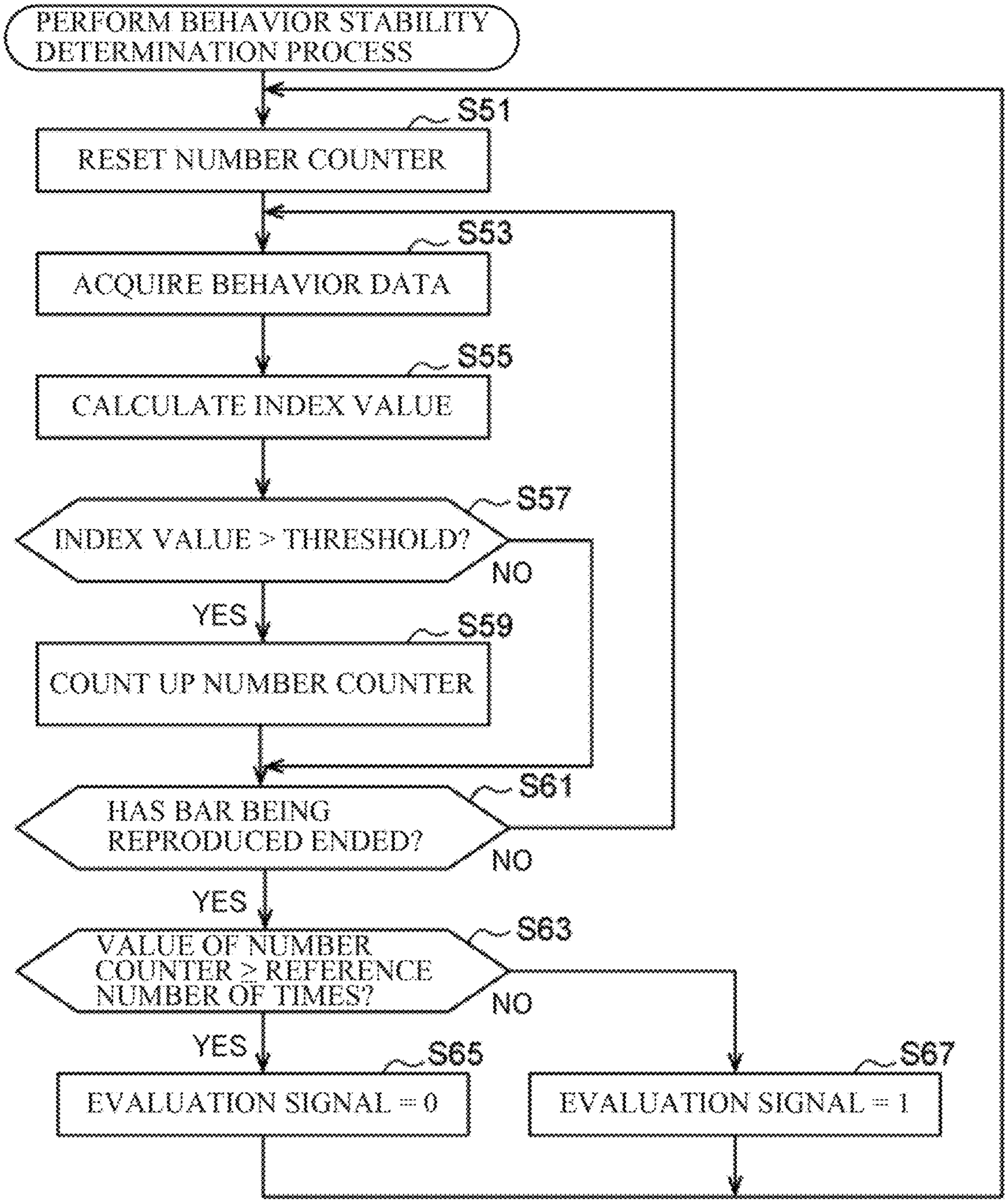
FIG. 11 is a flowchart illustrating the behavior stability determination process illustrated in FIG. 7.

Thereafter, the behavior stability determiner 69 may execute the process of determining the behavior stability of the vehicle (step S23). FIG. 11 is a flowchart illustrating a routine of the behavior stability determination process. First, the behavior stability determiner 69 may reset a number counter C that counts the number of times when the behavior of the vehicle becomes unstable (step S51).

Thereafter, the obtainer 61 may acquire the data indicating the behavior of the vehicle having been transmitted from the vehicle behavior measurer 11 (step S53). In the present example embodiment, the obtainer 61 may acquire the data on the vehicle speed, the longitudinal acceleration rate, the lateral acceleration rate, the vertical acceleration rate, the angular velocity of the roll angle, the angular velocity of the pitch angle, and the angular velocity of the yaw angle.

Thereafter, the data processing unit 67 may execute the smoothing processing, the absolute value conversion processing, and the differential processing on each of the pieces of the acquired data, and thereby calculate the index value indicating the magnitude of the behavior of the vehicle (step S55). The data processing unit 67 may replace respective values of the data pieces to be used with values of the same index (e.g., into values in the range from 0 to 100), and set, to the index value, the average value of the values of all of the data pieces to be used.

Thereafter, the behavior stability determiner 69 may determine whether the calculated index value has exceeded the threshold thre_A (step S57). If the index value has not exceeded the threshold thre_A (step S57: NO), the behavior stability determiner 69 may cause the process to directly proceed to step S61. If the index value has exceeded the threshold thre_A (step S57: YES), the behavior stability determiner 69 may count up (add plus one on) the number counter C (step S59).

Thereafter, the behavior stability determiner 69 may determine whether the bar seg being reproduced of the audio source data item has ended (step S61). For example, the behavior stability determiner 69 may determine whether a reproduction position of the audio source data item is a reproduction end position corresponding to an end position of the bar seg. If determining that the bar seg being reproduced of the audio source data item has not ended (step S61: NO), the behavior stability determiner 69 may cause the process to return to step S53. If determining that the bar seg being reproduced of the audio source data item has ended (step S61: YES), the behavior stability determiner 69 may determine whether a counter value of the number counter C has reached a reference number of times CO (step S63).

If the counter value of the number counter C has not reached the reference number of times CO (step S63: NO), the behavior stability determiner 69 may generate the evaluation signal (the evaluation signal=1) indicating that the behavior of the vehicle during the reproduction of the audio source data item from the set reproduction start position to the set reproduction end position has been in the stable state (step S67). If the counter value of the number counter C has reached the reference number of times CO (step S63: YES), the behavior stability determiner 69 may generates no evaluation signal (the evaluation signal=0), because the behavior of the vehicle during the reproduction of the audio source data item from the set reproduction start position to the set reproduction end position has been in an unstable state (step S65).

The behavior stability determiner 69 may execute the process of generating the evaluation signal or generating no evaluation signal when the bar seg being reproduced has ended, subsequently cause the process to return to step S51 and thereby reset the number counter C, and then continue the behavior stability determination process.

Referring back to FIG. 9, while the behavior stability determiner 69 is executing the behavior stability determination process, the audio source reproduction processing unit 73 may determine whether the reproduction of the bar seg being reproduced has ended (step S25). The audio source reproduction processing unit 73 may determine whether the reproduction position of the audio source data item is the reproduction end position of the audio source data item, corresponding to the end position of the bar seg being reproduced. If determining that the reproduction of the bar seg being reproduced has not ended (step S25: NO), the audio source reproduction processing unit 73 may cause the process to return to step S23. If determining that the reproduction of the bar seg being reproduced has ended (step S25: YES), the audio source reproduction processing unit 73 may determine whether the behavior stability determiner 69 has generated the evaluation signal (step S27).

If determining that the evaluation signal has been generated (step S27: YES), the audio source reproduction processing unit 73 may cause the audio source data item to proceed to the next bar seg as the bar to be reproduced (step S29). If determining that the evaluation signal has not been generated (step S27: NO), the audio source reproduction processing unit 73 may set the same bar as that currently set, to the bar to be reproduced (step S31). Accordingly, the bar seg to be reproduced next may be set.

Thereafter, the audio source reproduction processing unit 73 may determine whether to terminate the auditory stimulation output process (step S33). If determining that the auditory stimulation output process is not to be terminated (step S33: NO), the audio source reproduction processing unit 73 may cause the process to return to step S17 and reproduce the set bar. If the audio source reproduction processing unit 73 has determined that the auditory stimulation output process is to be terminated (step S33: YES), the sensitivity determiner 63 may determine the sensitivity of the driver to the change in the reproduction method and update the data on the sensitivity held in the storage 55 (step S35).

For example, from a start to an end of the auditory stimulation output process, the sensitivity determiner 63 may determine the degree of the change appearing in the behavior stability of the vehicle before and after the audio source reproduction processing unit 73 has changed the reproduction method of the audio source data item. The sensitivity determiner 63 may allocate the sensitivity to the change in the reproduction method to one of the levels, i.e., "low", "slightly low", "slightly high", and "high", depending on the ratio of the number of the changes appearing in the behavior stability of the vehicle to the number of the changes in the reproduction method of the audio source data item. The sensitivity determiner 63 may store, in the storage 55, the data on the determination result as being associated with the identification data on the driver.

The held data on the sensitivity to the change in the reproduction method may be used in the next and subsequent auditory stimulation output processes. After the sensitivity determiner 63 determines the sensitivity of the driver to the change in the reproduction method, the processor 53 may stop the auditory stimulation output process and thereby terminate this routine.

4. Example Effects of Present Example Embodiment

As described above, during the traveling of the vehicle, the driver assistance apparatus 1 according to the present example embodiment: acquires the data indicating the behavior of the vehicle; reproduces the audio source data item by the normal reproduction way at the constant reproduction sound volume and at the constant reproduction speed while causing the bars or the parts to proceed in the predetermined order, when the behavior of the vehicle is stable; and reproduces the audio source data item by the other reproduction way different from the normal reproduction way, when the behavior of the vehicle is unstable. Such a configuration helps to allow the driver who is driving to recognize the behavior stability of the vehicle in real time. Further, the auditory stimulation including neither displayed information nor text information on the sounds helps to allow the driver to intuitively recognize the behavior stability through the auditory stimulation, thereby suppressing a decrease in attention. Furthermore, when the behavior of the vehicle is stable, the audio source data item is reproduced by the normal reproduction way at the constant reproduction sound volume and at the constant reproduction speed while causing the bars or the parts to proceed in the predetermined order. This configuration helps to allow the driver to be motivated to perform the driving operation leading to a more stable behavior of the vehicle.

In addition, the driver assistance apparatus 1 according to the present example embodiment acquires the data on the sensitivity of the driver to the change in the reproduction method, and selects an audio source data item to be reproduced, from among the multiple audio source data items, depending on the sensitivity of the driver. Such a configuration allows the audio source data item whose change in the reproduction method is easy to notice to be selected for the driver who has low sensitivity to the change in the reproduction method. This helps to enhance the reliability in allowing the driver to recognize the behavior stability of the vehicle produced by the driving operation performed by the driver.

Moreover, the driver assistance apparatus 1 according to the present example embodiment may compare the index value calculated based on the measured data acquired during the traveling of the vehicle, with the predetermined threshold, and use the number of times when the index value exceeds the predetermined threshold as the data on the behavior stability. Such a configuration helps to prevent the behavior stability of the vehicle from being determined to have been decreased when the index value has exceeded the threshold just once. This helps to properly evaluate the behavior stability produced by the driving operation performed by the driver.

Further, the driver assistance apparatus 1 according to the present example embodiment may set the threshold or the reference number of times, based on the information on the attributes related to the driving skills of the driver. In one example, the threshold may be made lower or the reference number of times may be decreased as the driving skills of the driver are higher, whereas the threshold may be made higher or the reference number of times may be increased as the driving skills of the driver are lower. Such a configuration helps to guide the driver who has the high driving skills to a driving operation state leading to further improvement in the behavior stability of the vehicle. The configuration also helps to guide the driver who has the low driving skills to the appropriate level of the behavior stability, corresponding to the driving skills of the driver.

In some embodiments, in the other reproduction way different from the normal reproduction way when the behavior of the vehicle is unstable, the driver assistance apparatus 1 may reproduce the bars or the parts in the order different from the predetermined order, or reproduce the audio source data item at the changed reproduction sound volume or at the changed reproduction speed. Such a configuration helps to make the driver feel the strangeness when the behavior of the vehicle is in the unstable state, thereby allowing the driver to be motivated to perform the driving operation leading to the more stable behavior of the vehicle.

In some embodiments, the driver assistance apparatus 1 may determine whether the actual surrounding situation of the traveling vehicle is the predetermined surrounding situation that makes the change in the reproduction method difficult to notice. If determining that the actual surrounding situation is the predetermined surrounding situation, the driver assistance apparatus 1 according to the present example embodiment may determine the reproduction sound volume or the reproduction speed of the audio source data item depending on the actual surrounding situation. Such a configuration helps to enhance the reliability in allowing the driver to recognize that the behavior of the vehicle is in the unstable state through the change in the reproduction method of the audio source data item.

In some embodiments, the driver assistance apparatus 1 may determine whether the actual surrounding situation is the situation where the amount of the driving operation or the driving operation tasks to be performed by the driver is large, as the predetermined surrounding situation that makes the change in the reproduction method difficult to notice. Such a configuration helps to enhance the reliability in allowing the driver to recognize that the behavior of the vehicle is in the unstable state, even in a situation where the driver is likely to pay attention to an object other than the audio source data item.

In some embodiments, the driver assistance apparatus 1 may determine whether the actual surrounding situation is one of the situation where the sound around the vehicle is large, the situation where the traveling sound of the vehicle is large, the situation where the rainfall is high, or the situation where the wind speed is high, as the predetermined surrounding situation that makes the change in the reproduction method difficult to notice. Such a configuration helps to enhance the reliability in allowing the driver to recognize that the behavior of the vehicle is in the unstable state, even in a situation where reproduction sounds of the audio source data item are likely to be obscured by sounds other than those of the audio source data item.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the foregoing example embodiment, the vehicle behavior measurer 11 of the driver assistance apparatus 1 may include the sensors provided in the vehicle, the outputting device 21 may include the speaker system provided in the vehicle, and the data processing device 50 may be communicably coupled to the vehicle behavior measurer 11 and the outputting device 21 via the communication bus such as the CAN; however, the technology according to an example embodiment of the disclosure is not limited to this example. In some embodiments, the driver assistance apparatus 1 may include a portable terminal device such as a smartphone. The driver assistance apparatus 1 including the portable terminal device allows the auditory stimulation output process to be performed in any kinds of vehicles to be driven. This helps to increase opportunities of improving the driving skills of the driver, and also improve the driving skills when the driver drives a vehicle of a different model.

In this case, the outputting device 21 may be a speaker installed in the portable terminal device, or a speaker system of the vehicle that is coupled to the portable terminal device via a wireless communicator or a wired communication line. In some embodiments where the driver assistance apparatus 1 includes the portable terminal device, for example, the vehicle behavior measurer 11 may include sensors, such as an acceleration rate sensor, installed in the portable terminal device. In this case, to accurately estimate the behavior of the vehicle with such a sensor, the data processing device 50 may be configured to execute a process of converting an axial direction of the sensor installed in the portable terminal device into a predetermined direction. For example, the data processing device 50 may detect a direction of a gravitational acceleration rate with the sensor installed in the portable terminal device in a state in which the vehicle is stopped on a horizontal road, store data on a difference between the direction of the gravitational acceleration rate and the axial direction of the sensor, and convert the axial direction of the sensor into the predetermined direction, based on the data on the difference. In some embodiments, the data processing device 50 may execute a process of guiding the portable terminal device to be placed in the vehicle in such a manner that the axial direction of the sensor installed in the portable terminal device coincides with a longitudinal direction or a lateral direction of the vehicle, when executing the auditory stimulation output process.

For example, in the foregoing example embodiment, the data processing device 50 of the driver assistance apparatus 1 may be configured as a single device; however, the technology according to an example embodiment of the disclosure is not limited to this example. In some embodiments, all or a part of the operation of the data processing device 50 may be provided by an external server provided outside the vehicle.

Further, the technology according to any embodiment of the disclosure may be implemented as a vehicle equipped with the driver assistance apparatus described in the foregoing example embodiment, a driver assistance processing method performed by the driver assistance apparatus, a computer program that causes a computer to operate as the driver assistance apparatus, and a non-transitory recording medium containing the computer program.

Various control devices (e.g., the data processing device 50) illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the various control devices (e.g., the data processing device 50) illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the various control devices (e.g., the data processing device 50) illustrated in FIG. 1.

The invention claimed is:

1. A driver assistance apparatus to be applied to a vehicle, the driver assistance apparatus being configured to present behavior stability of the vehicle through auditory stimulation to a driver who drives the vehicle, the driver assistance apparatus comprising:

one or more processors;

one or more memories communicably coupled to the one or more processors; and an audio source data storage communicably coupled to the one or more processors, the audio source data storage being configured to store audio source data items, wherein each of the audio source data items comprises bars or parts and is classified based on a degree to which a change in a reproduction method of that audio source data item is noticeable to the driver, the one or more processors are configured to:

determine sensitivity of the driver to the change in the reproduction method, based on a degree of a change appearing in the behavior stability of the vehicle before and after changing the reproduction method of an audio source data item;

store data on the sensitivity in the one or more memories in association with identification data of the driver;

acquire the data on the sensitivity of the driver to the change in the reproduction method by reading, from the one or more memories, the data on the determined sensitivity associated with the identification data of the driver;

select, as a selected audio source data item, one of the audio source data items to be reproduced, from among the audio source data items set to be selectable depending on the sensitivity of the driver, wherein, as the sensitivity of the driver is lower, the audio source data items set to be selectable are limited to one or more audio source data items each classified as having a higher degree to which a change in a reproduction method of that audio source data item is noticeable to the driver;

determine the behavior stability, based on a change in a behavior of the vehicle;

reproduce the selected audio source data item by a normal reproduction method when the behavior stability is higher than a predetermined criterion, the normal reproduction method being designed to reproduce the selected audio source data item at a constant reproduction sound volume and at a constant reproduction speed while causing the bars or the parts to proceed in a predetermined order; and reproduce the selected audio source data item by another reproduction method different from the normal reproduction method when the behavior stability is lower than the predetermined criterion.

2. The driver assistance apparatus according to claim 1, wherein the one or more processors are configured to reproduce the selected audio source data item by the reproduction method different from the normal reproduction method when the behavior stability is lower than the predetermined criterion, the reproduction method different from the normal reproduction method being designed to reproduce the bars or the parts in an order different from the predetermined order, or reproduce the selected audio source data item at a reproduction sound volume different from the constant reproduction sound volume or at a reproduction speed different from the constant reproduction speed.

3. The driver assistance apparatus according to claim 1, wherein the one or more processors are configured to determine whether an actual surrounding situation of the vehicle is a predetermined surrounding situation that makes the change in the reproduction method difficult for the driver to notice, and the one or more processors are configured to, when the actual surrounding situation is the predetermined surrounding situation, determine a reproduction sound volume or a reproduction speed of the selected audio source data item, depending on the actual surrounding situation.

4. The driver assistance apparatus according to claim 3, wherein the one or more processors are configured to determine whether the actual surrounding situation is a situation where an amount of a driving operation or a number of driving operation tasks to be performed by the driver is large, as the predetermined surrounding situation that makes the change in the reproduction method difficult for the driver to notice.

5. The driver assistance apparatus according to claim 3, wherein the one or more processors are configured to determine whether the actual surrounding situation is one of a situation where a sound around the vehicle is large, a situation where a traveling sound of the vehicle is large, a situation where rainfall is high, or a situation where a wind speed is high, as the predetermined surrounding situation that makes the change in the reproduction method difficult for the driver to notice.

6. The driver assistance apparatus according to claim 1, wherein the one or more processors are configured to determine the sensitivity of the driver to a change in a reproduction method of the selected audio source data item based on a ratio of:

a number of changes appearing in the behavior stability of the vehicle before and after the reproduction method of the selected audio source data item is changed, to a number of changes in the reproduction method of the selected audio source data item.

7. The driver assistance apparatus according to claim 1, wherein, for each of the audio source data items, the degree to which a change in a reproduction method of that audio source data item is noticeable to the driver is set based on at least one of:

a number of times of reproduction of that audio source data item, based on a reproduction history in past driving of the vehicle by the driver;

a number of times of selecting a music piece corresponding to that audio source data item in karaoke by the driver; or a degree of coincidence, in lyrics, interval, and rhythm, between that audio source data item and a music piece selected in the past by the driver.

8. The driver assistance apparatus according to claim 1, wherein the one or more processors are configured to select, as the selected audio source data item, one of the audio source data items by referring to a data table in which selectable audio source data items are set depending on the sensitivity of the driver, and wherein the data table is configured such that:

when the sensitivity of the driver is low, one or more audio source data items classified as easy to notice are selectable;

when the sensitivity of the driver is slightly low, one or more audio source data items classified as slightly easy to notice or easy to notice are selectable;

when the sensitivity of the driver is slightly high, one or more audio source data items classified as slightly difficult to notice, slightly easy to notice, or easy to notice are selectable; and when the sensitivity of the driver is high, one or more audio source data items classified as difficult to notice, slightly difficult to notice, slightly easy to notice, or easy to notice are selectable.

9. A driver assistance processing method that presents behavior stability of a vehicle through auditory stimulation to a driver who drives the vehicle, the method comprising:

storing audio source data items in one or more memories, wherein each of the audio source data items comprises bars or parts and is classified based on a degree to which a change in a reproduction method of that audio source data item is noticeable to the driver;

determining sensitivity of the driver to the change in the reproduction method, based on a degree of a change appearing in the behavior stability of the vehicle before and after changing the reproduction method of an audio source data item;

storing data on the sensitivity in the one or more memories in association with identification data of the driver;

acquiring the data on the sensitivity of the driver to a change in a reproduction method by reading, from the one or more memories, the data on the determined sensitivity associated with the identification data of the driver;

selecting, as a selected audio source data item, one of the audio source data items to be reproduced, from among the audio source data items set to be selectable depending on the sensitivity of the driver, wherein, as the sensitivity of the driver is lower, the audio source data items set to be selectable are limited to one or more audio source data items each classified as having a higher degree to which a change in a reproduction method of that audio source data item is noticeable to the driver;

determining the behavior stability, based on a change in a behavior of the vehicle;

reproducing the selected audio source data item by a normal reproduction method when the behavior stability is higher than a predetermined criterion, the normal reproduction method being designed to reproduce the selected audio source data item at a constant reproduction sound volume and at a constant reproduction speed while causing the bars or the parts to proceed in a predetermined order; and reproducing the selected audio source data item by another reproduction method different from the normal reproduction method when the behavior stability is lower than the predetermined criterion.

10. A non-transitory computer-readable recording medium containing a program, the program causing, when executed by a computer, the computer to implement a method, the method comprising:

storing audio source data items in one or more memories, wherein each of the audio source data items comprises bars or parts and is classified based on a degree to which a change in a reproduction method of that audio source data item is noticeable to a driver of a vehicle;

determining sensitivity of the driver to the change in the reproduction method, based on a degree of a change appearing in behavior stability of the vehicle before and after changing the reproduction method of an audio source data item;

storing data on the sensitivity in the one or more memories in association with identification data of the driver;

acquiring the data on sensitivity of a driver who drives a vehicle to a change in a reproduction method by reading, from the one or more memories, the data on the determined sensitivity associated with the identification data of the driver;

selecting, as a selected audio source data item, one of the audio source data items to be reproduced, from among the audio source data items set to be selectable depending on the sensitivity of the driver, wherein, as the sensitivity of the driver is lower, the audio source data items set to be selectable are limited to one or more audio source data items each classified as having a higher degree to which a change in a reproduction method of that audio source data item is noticeable to the driver;

determining the behavior stability, based on a change in a behavior of the vehicle;

reproducing the selected audio source data item by a normal reproduction method when the behavior stability is higher than a predetermined criterion, the normal reproduction method being designed to reproduce the selected audio source data item at a constant reproduction sound volume and at a constant reproduction speed while causing the bars or the parts to proceed in a predetermined order; and reproducing the selected audio source data item by another reproduction method different from the normal reproduction method when the behavior stability is lower the predetermined criterion.

* * * * *